US012485693B2

(12) United States Patent
Chonan et al.

(10) Patent No.: US 12,485,693 B2
(45) Date of Patent: Dec. 2, 2025

(54) PERFECT-BOUND BOOKLET AND METHOD FOR MANUFACTURING PERFECT-BOUND BOOKLET

(71) Applicant: FUJIFILM Business Innovation Corp., Tokyo (JP)

(72) Inventors: Shiori Chonan, Kanagawa (JP); Takashi Hasegawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/424,853

(22) Filed: Jan. 28, 2024

(65) Prior Publication Data

US 2024/0326505 A1 Oct. 3, 2024

(30) Foreign Application Priority Data

Mar. 28, 2023 (JP) ................................ 2023-052433

(51) Int. Cl.
*B42C 9/00* (2006.01)
*B42D 5/00* (2006.01)

(52) U.S. Cl.
CPC ............ *B42C 9/0081* (2013.01); *B42D 5/003* (2013.01)

(58) Field of Classification Search
CPC .............................. B42C 9/0081; B42D 5/003
USPC ......... 281/3.1, 5, 15.1, 38; 283/61, 62, 63.1, 283/67, 72, 94, 98, 101; 40/726; 156/222
See application file for complete search history.

(56) References Cited

U.S. PATENT DOCUMENTS

2006/0019050 A1* 1/2006 Gilmer .................. B42D 5/003 428/40.1
2006/0034672 A1* 2/2006 VanDeWalle .......... B42D 3/002 412/33
2009/0199952 A1* 8/2009 Roque ....................... B32B 7/06 156/87
2017/0350823 A1 12/2017 Kelly et al.
2019/0353598 A1 11/2019 Kelly et al.
2021/0269272 A1 9/2021 Yoshino et al.

FOREIGN PATENT DOCUMENTS

JP 2018503817 2/2018
JP 2021133617 9/2021

* cited by examiner

*Primary Examiner* — Justin V Lewis
(74) *Attorney, Agent, or Firm* — JCIPRNET

(57) ABSTRACT

A perfect-bound booklet includes a sheet set that is a stack of multiple sheets and multiple adhesive layers provided at an end of each sheet in the sheet set and interposed between the sheets and peelably bonding the sheets together, the multiple adhesive layers containing a thermoplastic adhesive agent, and the amount of the thermoplastic adhesive agent in the multiple adhesive layers changes from each of a first surface side and a second surface side of the booklet toward the middle of the booklet in the thickness direction.

20 Claims, 7 Drawing Sheets

PERFECT-BOUND BOOKLET AND METHOD FOR MANUFACTURING PERFECT-BOUND BOOKLET

CROSS-REFERENCE TO RELATED APPLICATIONS

This application is based on and claims priority under 35 USC 119 from Japanese Patent Application No. 2023-052433 filed Mar. 28, 2023.

BACKGROUND

(i) Technical Field

The present disclosure relates to a perfect-bound booklet and a method for manufacturing a perfect-bound booklet.

(ii) Related Art

In Japanese Unexamined Patent Application Publication (Translation of PCT Application) No. 2018-503817, "a binding method of a perfect-bound booklet comprising: a paper folding step of folding each leaf of sheets forming a body to obtain multiple signatures; a pressing step of pressing creased parts of the multiple signatures in a thickness direction of the multiple signatures; a paper jogging step of jogging a one-book bundle formed of a predetermined number of signatures forming a body, a front cover, and a back cover, or a multi-book bundle formed by stacking a plurality of one-book bundles on top of one another; a first application step of applying a first adhesive that becomes flexible by curing, in a layer in a middle area 5 to 10 millimeters width from both top and bottom end edges of a rear face of the one-book bundle or the multi-book bundle; and a second application step of applying a second adhesive in a layer on an entire face of the one-book bundle including the parts where the first adhesive is not applied, after leaving the first adhesive layer for a predetermined drying time." is proposed.

In Japanese Unexamined Patent Application Publication No. 2021-133617, "a method for producing a booklet, the method comprising: providing pressure-induced phase transition particles to a part of an outside margin portion or a portion to be folded of a recording medium; bonding the pressure-induced phase transition particles to the recording medium; and pressure-bonding a multilayer body in which a plurality of recording media are stacked, the recording media including the recording medium having the pressure-induced phase transition particles bonded thereon, wherein the pressure-induced phase transition particles contain a styrene resin containing styrene and a vinyl monomer other than styrene as polymerization components, and a (meth) acrylic acid ester resin that contains at least two (meth) acrylic acid esters as polymerization components, and a mass ratio of the (meth)acrylic acid esters relative to a total of polymerization components of the (meth)acrylic acid ester resin is 90 mass % or more, and the pressure-induced phase transition particles have at least two glass transition temperatures, and the difference between the lowest glass transition temperature and the highest glass transition temperature among the glass transition temperatures exhibited by the pressure-induced phase transition particles is 30° C. or more." is proposed.

SUMMARY

Aspects of non-limiting embodiments of the present disclosure relate to a perfect-bound booklet including a sheet set that is a stack of multiple sheets and multiple adhesive layers provided at an end of each sheet in the sheet set and interposed between the sheets and peelably bonding the sheets together, the multiple adhesive layers containing a thermoplastic adhesive agent, and this booklet may exhibit strong adhesion between sheets and may be unlikely to experience a peeling defect (tearing or damage) when a sheet is peeled away, compared with when the amount of the thermoplastic adhesive agent in the multiple adhesive layers remains constant from each of a first surface side and a second surface side of the booklet toward the middle of the booklet in the thickness direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a perfect-bound booklet including a sheet set that is a stack of multiple sheets; and multiple adhesive layers provided at an end of each sheet in the sheet set and interposed between the sheets and peelably bonding the sheets together, the multiple adhesive layers containing a thermoplastic adhesive agent, wherein an amount of the thermoplastic adhesive agent in the multiple adhesive layers changes from each of a first surface side and a second surface side of the booklet toward a middle of the booklet in a thickness direction.

BRIEF DESCRIPTION OF THE DRAWINGS

Exemplary embodiments of the present disclosure will be described in detail based on the following figures, wherein.

DETAILED DESCRIPTION

Figure 1:
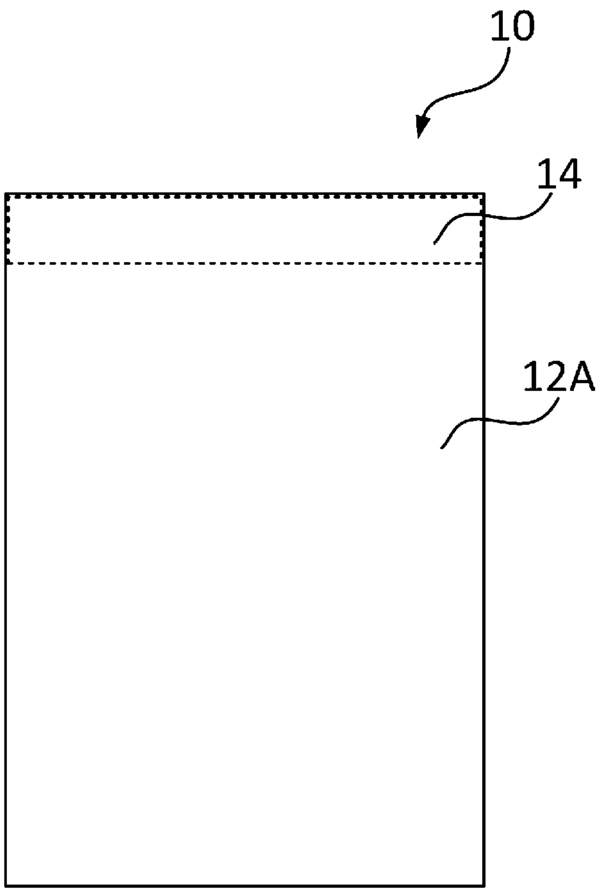
FIG. 1 is a schematic plan view illustrating an example of a perfect-bound booklet according to an exemplary embodiment.

Exemplary embodiments of the present disclosure will now be described. These descriptions and the Examples are intended to illustrate exemplary embodiments and not intended to limit the scope of exemplary embodiments.

In a series of numerical ranges presented herein, an upper or lower limit specified in one numerical range may be substituted with the upper or lower limit of another numerical range in the same series. In a numerical range presented herein, furthermore, the upper or lower limit of the numerical range may be substituted with a value indicated in the Examples.

As used herein, the word "step" refers not only to an independent step; even if a step is not clearly differentiated from another, the step is included in this term as long as its intended purpose is fulfilled.

When an exemplary embodiment is described with reference to a drawing herein, the structure of the exemplary embodiment is not limited to the structure illustrated in the drawing. The size of elements in each drawing, furthermore, is conceptual; the relationship between the sizes of elements is not limited to what is illustrated.

A constituent herein may include multiple substances corresponding to it. When the amount of a constituent in a composition is mentioned herein, and if multiple substances corresponding to the constituent are present in the composition, the mentioned amount represents the total amount of the multiple substances present in the composition unless stated otherwise.

A constituent herein may include multiple types of particles corresponding to it. When multiple types of particles corresponding to a constituent are present in a composition, the particle size of the constituent is a value for the mixture of the multiple types of particles present in the composition unless stated otherwise.

As used herein, the term "(meth)acrylic" means that it may be any of "acrylic" or "methacrylic," and the term "(meth)acrylate" means that it may be any of an "acrylate" or "methacrylate."

Perfect-Bound Booklet

A perfect-bound booklet (hereinafter also referred to as "booklet") according to an exemplary embodiment includes a sheet set that is a stack of multiple sheets and multiple adhesive layers provided at an end of each sheet in the sheet set and interposed between the sheets and peelably bonding the sheets together, the multiple adhesive layers containing a thermoplastic adhesive agent, wherein the amount of the thermoplastic adhesive agent in the multiple adhesive layers changes from each of a first surface side and a second surface side of the booklet toward the middle of the booklet in the thickness direction.

The perfect-bound booklet is manufactured by forming multiple adhesive layers containing a thermoplastic adhesive agent at an end of each sheet in the sheet set and then bonding the sheets together at the end by applying heat and pressure from a first surface side and a second surface side of the end of the sheet set.

In the middle of the sheet set (i.e., the booklet) in the thickness direction, however, the heat and pressure are unlikely to be applied compared with the first surface side and the second surface side of the sheet set (i.e., the booklet).

The heat and pressure, therefore, are unlikely to be applied uniformly in the direction of the thickness of the sheet set (i.e., the booklet). As a result, the adhesion between sheets in the middle of the sheet set (i.e., the booklet) in the thickness direction can be weak. Increasing the heat and pressure during bonding to improve the adhesion between sheets in the middle of the sheet set (i.e., the booklet) in the thickness direction, however, can cause the adhesion between sheets on the first surface side and the second surface side of the sheet set (i.e., the booklet) to be excessively strong, resulting in a peeling defect (tearing or damage) when a sheet is peeled away.

To address this, the adhesive layers interposed between sheets in the middle of the sheet set (i.e., the booklet) in the thickness direction, of the multiple adhesive layers interposed between the sheets, are configured to contain the thermoplastic adhesive agent in an amount greater than that of the thermoplastic adhesive agent in the adhesive layers interposed between sheets on the first surface side and the second surface side of the sheet set (i.e., the booklet). This may make the adhesion between sheets in the middle of the sheet set (i.e., the booklet) in the thickness direction resulting from the heat and pressure during bonding stronger than the adhesion between sheets on the first surface side and the second surface side of the sheet set (i.e., the booklet). Through this, the strength of bonding between sheets may become more uniform between the first and second surface sides and the middle in the thickness direction of the sheet set (i.e., along the direction of the thickness of the sheet set) even without the application of much heat and pressure in the middle of the sheet set (i.e., the booklet) in the thickness direction compared with the first surface side and the second surface side of the sheet set (i.e., the booklet).

The booklet obtained by bonding the sheets in the sheet set together at the end through the application of heat and pressure may be completed as a product as it is; however, it may be divided into multiple portions in the thickness direction.

Forms of the booklet according to an exemplary embodiment, therefore, include "a form in which the amount of thermoplastic adhesive agent in multiple adhesive layers changes from each of a first surface side and a second surface side of the booklet toward the middle of the booklet in the thickness direction" as a result of the division of a manufactured product.

By virtue of the configuration described above, therefore, the booklet according to an exemplary embodiment may be a booklet that exhibits strong adhesion between sheets and is unlikely to experience a peeling defect (tearing or damage) when a sheet is peeled away.

The details of the booklet according to an exemplary embodiment will now be described.

Figure 2:
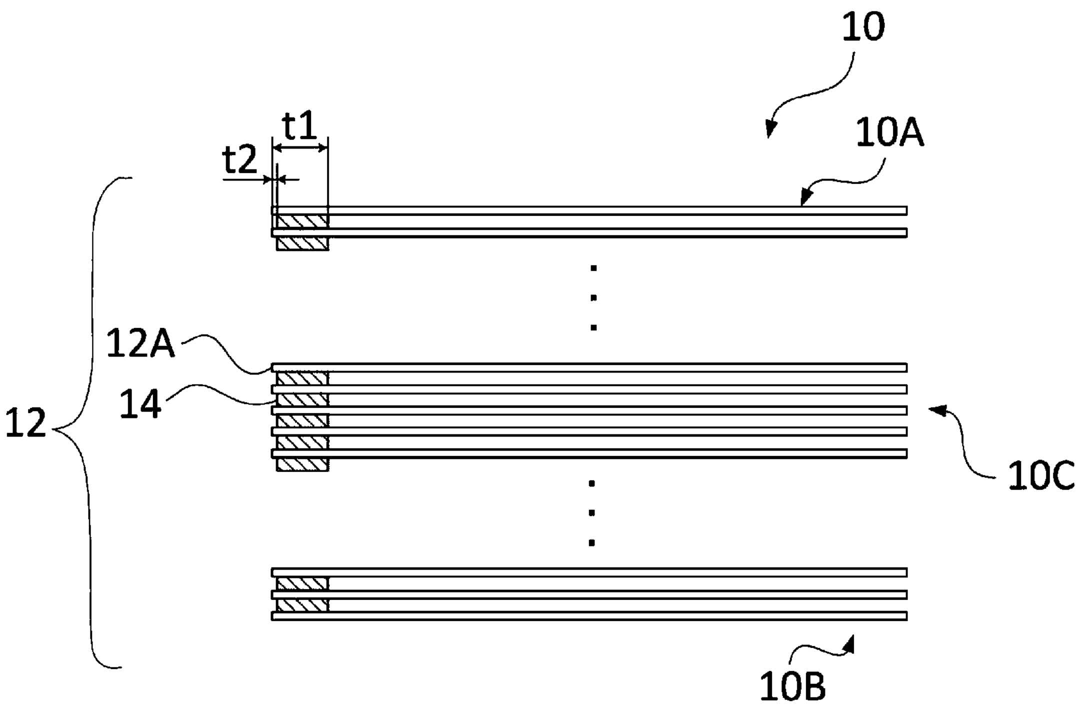
FIG. 2 is a schematic cross-sectional view illustrating an example of a perfect-bound booklet according to an exemplary embodiment.

An example of a booklet according to an exemplary embodiment is a booklet that includes a sheet set that is a stack of multiple sheets shaped rectangular in plan view and multiple adhesive layers provided at an end of each sheet of the sheet set and interposed between the sheets and peelably bonding the sheets together, the multiple adhesive layers containing a thermoplastic adhesive agent (see FIGS. 1 and 2).

Alternatively, the average shape of the sheets may be, for example, a polygonal shape, a round shape, or other shapes (e.g., a shape including multiple sides, with each side being straight or curved).

When rectangular, polygonal, or other sheets are used, the adhesive layers are provided at an end along, for example, one side of the sheets.

When round sheets are used, the adhesive layers are provided at an end along a length of, for example, ½ to 6/1 of the circumference of the round sheets.

As for the width of the region in which the adhesive layers are formed, the adhesive layers are formed in the region of, for example, 1 mm to 20 mm from an edge of each sheet in the booklet (see t1 in FIG. 2).

Each sheet in the booklet, however, may have a region without an adhesive layer within a range of, for example, more than 0 mm to 3 mm from the edge (see t2 in FIG. 2).

Figure 4:
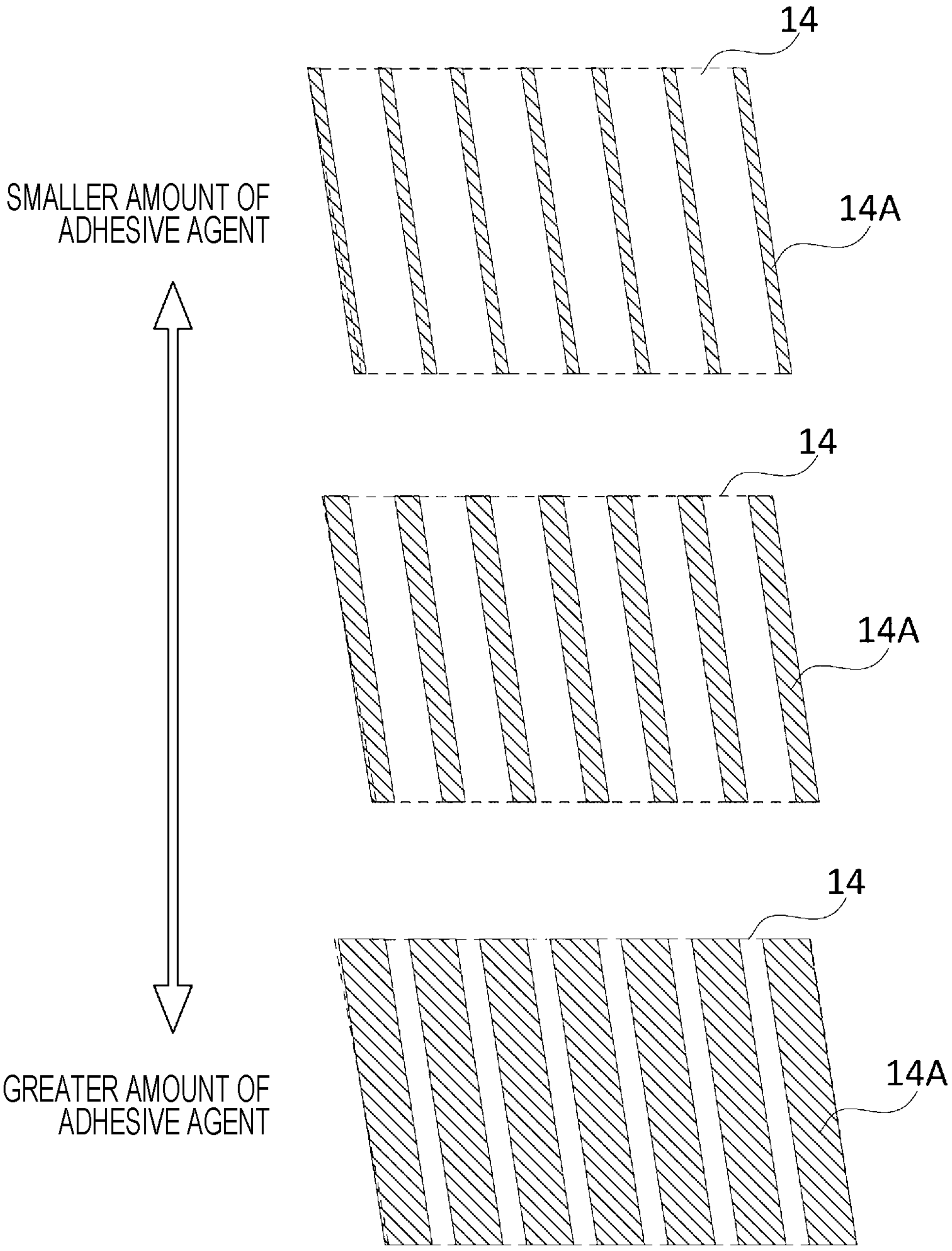
FIG. 4 is a schematic plan view illustrating an example of a line pattern of a thermoplastic adhesive agent in a perfect-bound booklet according to an exemplary embodiment.
Figure 5:
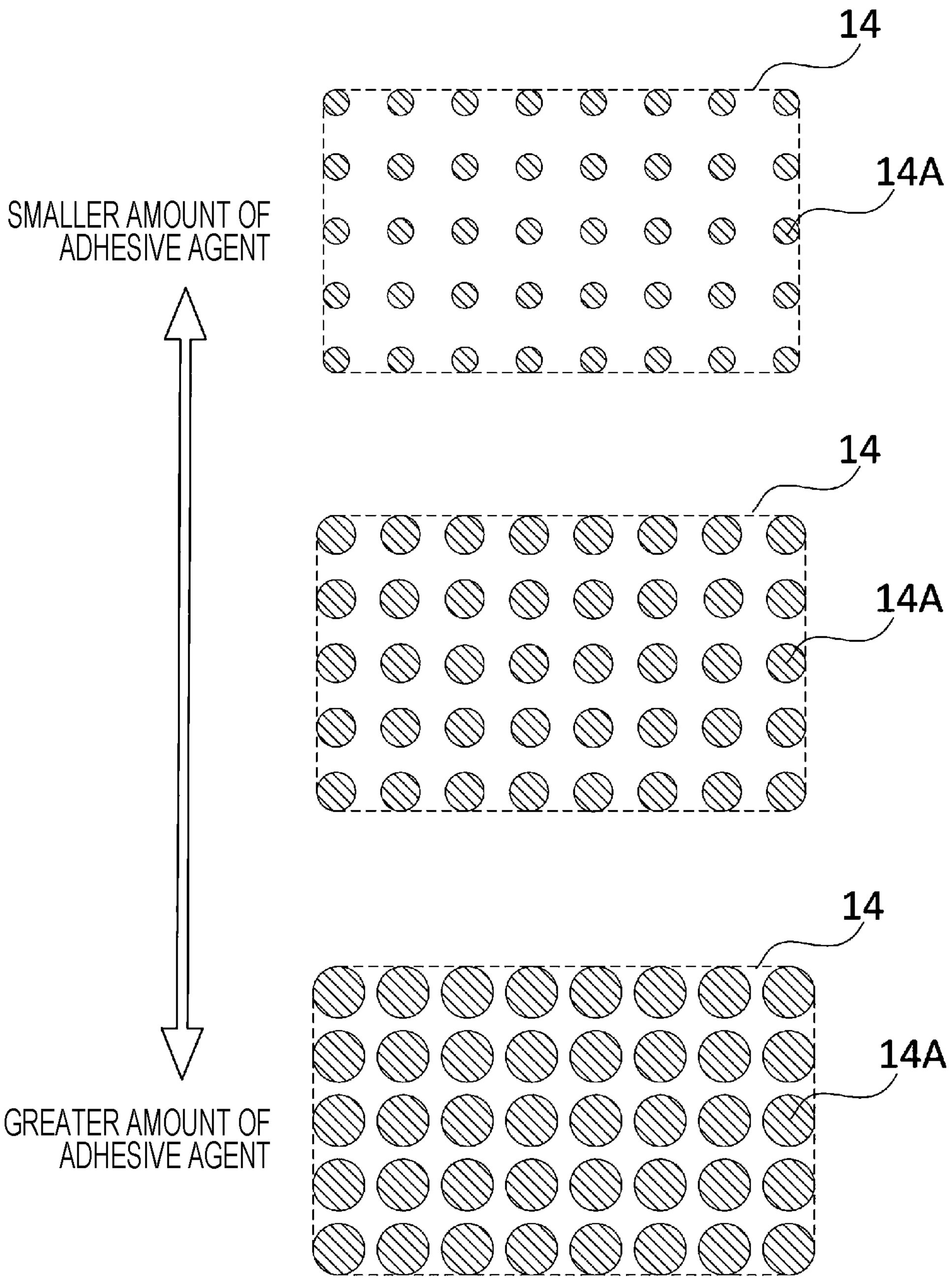
FIG. 5 is a schematic plan view illustrating an example of a dot pattern of a thermoplastic adhesive agent in a perfect-bound booklet according to an exemplary embodiment.

It should be noted that when the adhesive agent has been formed in a pattern, the region in which the adhesive layers are formed represents the region inside the outermost edges of the outer elements of the pattern (see the region enclosed by broken lines in FIGS. 4 and 5).

FIGS. 1 and 2 illustrate the booklet 10, a first surface 10A of the booklet 10, a second surface 10B of the booklet 10, the middle 10C of the booklet 10 in the thickness direction, the sheet set 12, the sheets 12A, and the adhesive layers 14.

The booklet according to an exemplary embodiment is configured such that the amount of the thermoplastic adhesive agent in the multiple adhesive layers changes from each of a first surface side and a second surface side of the booklet toward the middle of the booklet in the thickness direction. The change in the amount of the thermoplastic adhesive agent may be any of an increase or decrease.

Incidentally, a booklet according to an exemplary embodiment may be a booklet produced by bonding the sheets with the adhesive layers using the heat and pressure during bonding with the amount of the thermoplastic adhesive agent in the adhesive layers interposed between sheets in the middle of the sheet set (i.e., the booklet) in the thickness direction, of the multiple adhesive layers interposed between the sheets, being greater than that of the thermoplastic adhesive agent in the adhesive layers interposed between sheets on the first surface side and the second surface side of the sheet set (i.e., the booklet) or may be a booklet obtained by dividing this booklet in the thickness direction.

Figure 3:
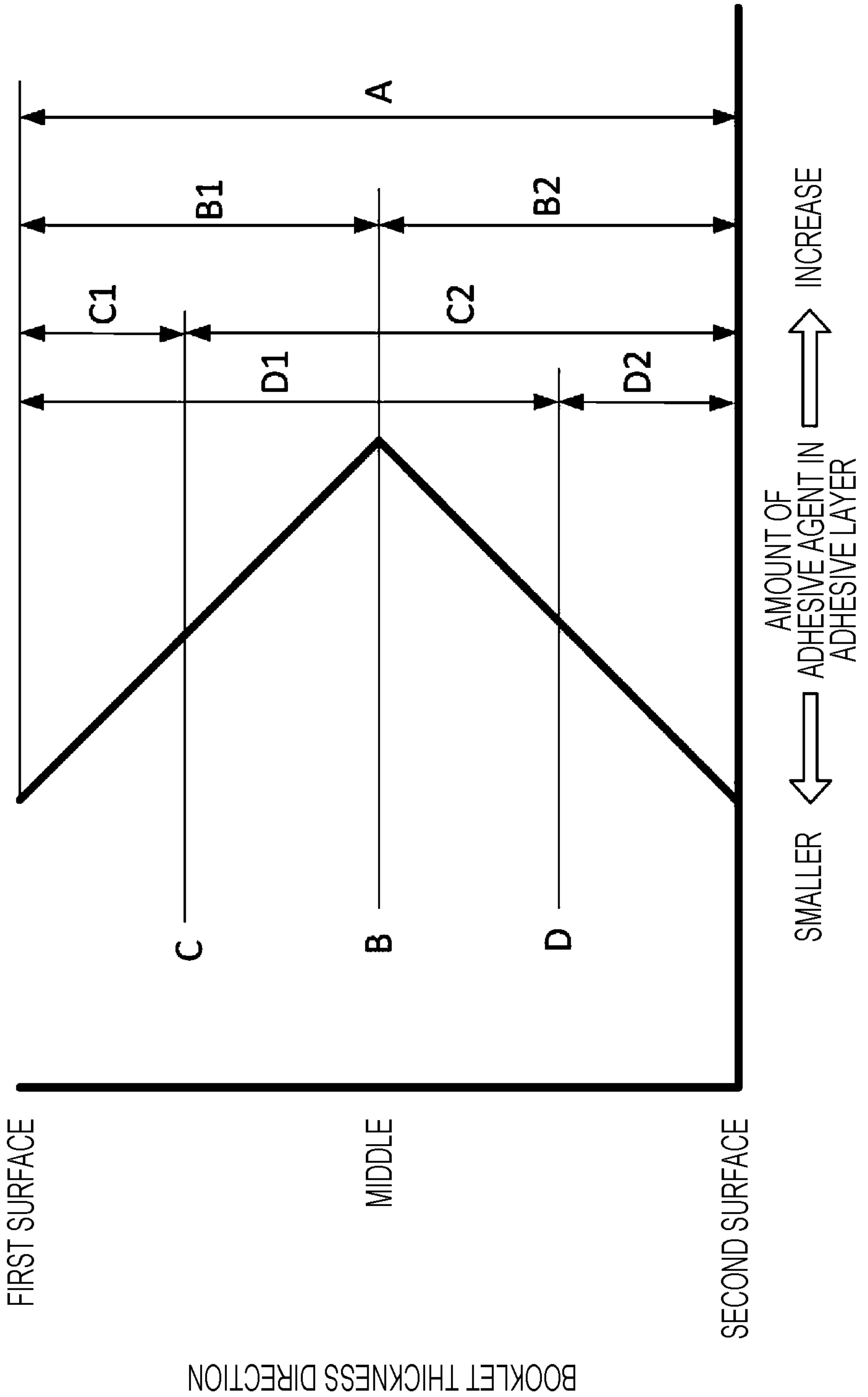
FIG. 3 is a schematic view illustrating an example of a profile, of a perfect-bound booklet according to an exemplary embodiment, for the amount of thermoplastic adhesive agent in multiple adhesive layers in the direction of the thickness of the booklet.

Examples of profiles for the amount of the thermoplastic adhesive agent in the multiple adhesive layers in the direction of the thickness of the booklet, therefore, include the following forms as illustrated in FIG. 3.

(1) The form in which the amount of the thermoplastic adhesive agent in the multiple adhesive layers increases from each of the first surface side and the second surface side of the booklet toward the middle of the booklet in the thickness direction (form A in FIG. 3).

(2) The form in which the amount of the thermoplastic adhesive agent in the multiple adhesive layers increases from the first surface side toward the second surface side of the booklet (form B1 in FIG. 3, which is a portion of the form in (1) divided at B, and form C1, which is a portion of the form in (1) divided at C).

(3) The form in which the amount of the thermoplastic adhesive agent in the multiple adhesive layers increases from the second surface side toward the first surface side of the booklet (form B2 in FIG. 3, which is a portion of the form in (1) divided at B, and form D2, which is a division of the form in (1) divided at D).

(4) The form in which the amount of the thermoplastic adhesive agent in the multiple adhesive layers increases from each of the first surface side and the second surface side of the booklet toward any point in the direction of the thickness of the booklet other than the middle of the booklet in the thickness direction (form C2 in FIG. 3, which is a portion of the form in (1) divided at C, and form D1, which is a portion of the form in (1) divided D).

Of these forms, the form in (1), in which the number of sheets in the booklet is greater than in the others, may be used in particular.

For the change in the amount of the thermoplastic adhesive agent in the multiple adhesive layers, the amount of the adhesive agent may be changed between sheets or may be changed between sets of multiple sheets (e.g., four or more and six or fewer sheets).

Of the multiple adhesive layers interposed between the sheets, the adhesive layers interposed between sheets in the middle of the booklet in the thickness direction may contain the thermoplastic adhesive agent in an amount 1.2 times or more and 4.0 times or less, preferably 1.7 times or more and 2.3 times or less, greater than the amount of the thermoplastic adhesive agent in the adhesive layers interposed between sheets on the first surface side and the second surface side of the booklet.

By setting the amount of the thermoplastic adhesive agent in the adhesive layers interposed between sheets in the middle of the booklet in the thickness direction within these ranges, the likelihood may be increased that the strength of bonding between sheets is uniform between the first and second surface sides and the middle in the thickness direction of the booklet, with sufficient bonding strength ensured. As a result, the adhesion between the sheets may be strong, yet it may be less likely that a peeling defect (tearing or damage) occurs when a sheet is peeled away.

The amount of the thermoplastic adhesive agent in the adhesive layers interposed between sheets on the first surface side and the second surface side of the booklet per unit area ($m^2$) may be 0.4 $g/m^2$ or more and 1.5 $g/m^2$ or less, preferably 0.6 $g/m^2$ or more and 1.0 $g/m^2$ or less.

The measurement of the amount of the thermoplastic adhesive agent in the adhesive layers interposed between sheets on the first surface side and the second surface side of the booklet and that of the factor by which the amount of the thermoplastic adhesive agent in the adhesive layers interposed between sheets in the middle of the booklet in the thickness direction is greater are, for example, as follows.

Ten copies of a booklet produced under the same conditions are prepared, and one sheet is extracted from the first surface, the second surface, and the middle in the thickness direction of each copy. The ten sheets extracted from the same point are collected, and the weight of the ten sheets from each location is measured. From the measured weights, the weight of sheets without applied glue is subtracted to give the amount of the adhesive agent at each point.

Then the factor by which the amount of the adhesive agent on a total of ten sheets in the middle in the thickness direction is greater than the amount of the adhesive agent on a total of ten sheets each at the first surface and the second surface is determined, and this factor is used as the "factor by which the amount of the thermoplastic adhesive agent in the adhesive layers interposed between sheets in the middle of the booklet in the thickness direction is greater than the amount of the thermoplastic adhesive agent in the adhesive layers interposed between sheets on the first surface side and the second surface side of the booklet."

From the amount of the adhesive agent on a total of ten sheets each and the total area of the region in which the adhesive layer is formed on a total of ten sheets each at the first surface and the second surface, furthermore, the amount of the adhesive agent on the first surface side and the second surface side per unit area ($m^2$) is determined.

The change in the amount of the adhesive agent per sheet between sets of five sheets by which the amount of the thermoplastic adhesive agent in the adhesive layers changes from each of the first surface side and the second surface side of the booklet toward the middle of the booklet in the thickness direction (hereinafter also referred to as "the differential amount of the adhesive agent") may be 0.18 $g/m^2$ or more, preferably 0.27 $g/m^2$ or more, more preferably 0.36 $g/m^2$ or more.

By setting the differential amount of the adhesive agent within these ranges, the likelihood may be increased that the strength of bonding between sheets is uniform between the first and second surface sides and the middle in the thickness direction of the booklet, with sufficient bonding strength ensured. As a result, the adhesion between the sheets may be strong, yet it may be less likely that a peeling defect (tearing or damage) occurs when a sheet is peeled away.

For the equalization of the force required for peeling, however, the differential amount of the adhesive agent is set to, for example, 0.54 $g/m^2$ or less.

In this context, the change in the amount of the adhesive agent per sheet between sets of five sheets represents the (absolute) difference between the amount of the adhesive agent on an N-th peeled sheet (e.g., the first sheet) and the amount of the adhesive agent on an N+5-th peeled sheet (e.g., the sixth sheet).

The method for measuring the differential amount of the adhesive agent is, for example, as follows.

Ten copies of a booklet produced under the same conditions are prepared, and one sheet is extracted from the first surface of the copies of interest. The ten sheets extracted from the same point are collected, and the weight of the ten sheets from each location is measured.

This operation is performed every five sheets from the first surface to the second surface of the copies, and the weight of the ten sheets from each point (i.e., the N-th and N+5-th sheets) is determined. The weight of sheets without applied glue is subtracted from the determined weights to give the amount of the adhesive agent at each point, and the amount of the adhesive agent per unit area of the adhesive layer is obtained from the area of the region in which the adhesive layer is formed. Then the differential amount of the adhesive agent per sheet between sets of five sheets is determined from the amount of the adhesive agent per unit area of the adhesive layer and arithmetically averaged.

The adhesive layers may be formed as a line pattern (see FIG. 4), a dot pattern (see FIG. 5), or a combination of a line pattern and a dot pattern of the thermoplastic adhesive agent.

Examples of line patterns of the thermoplastic adhesive agent include line patterns shaped like diagonal stripes, a grid, etc.

Examples of dot patterns of the thermoplastic adhesive agent include dot patterns formed by circles, polygons, stars, etc.

FIGS. 4 and 5 illustrate adhesive layers 14 and patterns 14A of the thermoplastic adhesive agent.

The amount of the thermoplastic adhesive agent in the multiple adhesive layers, furthermore, may change from each of the first surface side and the second surface side of the booklet toward the middle of the booklet in the thickness direction as a result of a change in at least one of the line width of a line pattern or the diameter of a dot pattern of the thermoplastic adhesive agent (see FIGS. 4 and 5).

As a result of the formation of the adhesive layers as a line pattern, a dot pattern, or a combination of a line pattern and a dot pattern of the thermoplastic adhesive agent, the amount of change in the amount of the thermoplastic adhesive agent in the multiple adhesive layers may be controlled more easily.

In addition, for the adhesive layers, the amount of the thermoplastic adhesive agent in the multiple adhesive layers may be changed with the use of the thickness of the thermoplastic adhesive agent (i.e., the adhesive layers) rather than a pattern of the thermoplastic adhesive agent (i.e., the area in which the adhesive agent is present). In other words, the amount of the thermoplastic adhesive agent in the multiple adhesive layers may change from each of the first surface side and the second surface side of the booklet toward the middle of the booklet in the thickness direction as a result of a change in the thickness of the thermoplastic adhesive agent (i.e., the adhesive layers).

Examples of sheets include sheets of, for example, coated paper, uncoated paper (i.e., ordinary paper for printing), and embossed paper.

The grammage of the sheets, however, may be 200 gsm or less, preferably 130 gsm or less. When the grammage of the sheets falls within these ranges, it may be more likely that the heat and pressure applied to the sheet set during the production of the booklet are applied sufficiently to the middle of the sheet set in the thickness direction. As a result, the adhesion between the sheets may be strong, yet it may be less likely that a peeling defect (tearing or damage) occurs when a sheet is peeled away.

In addition, for sufficient strength of the sheets to be ensured, the grammage of the paper is set to, for example, 50 gsm or more.

The grammage of the sheets is a value measured according to JIS P8124:2011 with sheets left at 23° C. and 50% RH for 24 hours.

The sheet set (i.e., the booklet) may be a sheet set that is a stack of 10 or more and 100 or fewer sheets, preferably 10 or more and 50 or fewer sheets, as the multiple sheets.

When the number of sheets in the sheet set (i.e., the booklet) falls within these ranges, it may be more likely that the heat and pressure applied to the sheet set during the production of the booklet are applied sufficiently to the middle of the sheet set in the thickness direction. As a result, the adhesion between the sheets may be strong, yet it may be less likely that a peeling defect (tearing or damage) occurs when a sheet is peeled away.

A booklet according to an exemplary embodiment is used by peeling a sheet away from the booklet (i.e., another sheet immediately underneath, bonded with an adhesive layer). After a sheet is peeled away, the adhesive layer may be sticking to the peeled sheet. In other words, when a sheet is peeled away, the separation may occur at the interface between the adhesive layer and another sheet immediately underneath.

It should be noted that the booklet may be in a form in which, when a sheet is peeled away, the adhesive layer may remain on another sheet immediately underneath, or may be in a form in which the adhesive layer is divided in the thickness direction and sticks to both the peeled sheet and another sheet immediately underneath.

Method for Manufacturing a Perfect-Bound Booklet

A method according to an exemplary embodiment for manufacturing a perfect-bound booklet includes:

- an attachment step, in which particles of a thermoplastic adhesive agent (hereinafter also referred to as "adhesive agent particles") are attached to an end of multiple sheets;
- a securing step, in which the adhesive agent particles are secured on the sheets; and
- a pressure bonding step, in which the multiple sheets having an adhesive layer containing the thermoplastic adhesive agent are stacked in such a manner that the adhesive layer is interposed between the sheets to give a sheet set, and then the sheets are pressure-bonded with the adhesive layer by applying pressure and heat to the adhesive layer.

In the method according to an exemplary embodiment for manufacturing a perfect-bound booklet, a perfect-bound booklet according to an exemplary embodiment is obtained through these steps.

In the method according to an exemplary embodiment for manufacturing a perfect-bound booklet, the amount of the thermoplastic adhesive agent in the adhesive layers interposed between sheets in the middle of the sheet set (i.e., the booklet) in the thickness direction, of the multiple adhesive layers interposed between the sheets, is set greater than that of the thermoplastic adhesive agent in the adhesive layers interposed between sheets on a first surface side and a second surface side of the sheet set (i.e., the booklet) in the attachment step.

The method according to an exemplary embodiment for manufacturing a booklet is performed by a system according to an exemplary embodiment for manufacturing a booklet, which is described below.

A system according to an exemplary embodiment for manufacturing a booklet includes:

- an attachment section, which contains adhesive agent particles and attaches the adhesive agent particles to an end of multiple sheets;
- a securing section, which secures the adhesive agent particles on the sheets; and
- a pressure bonding section, which stacks the multiple sheets having an adhesive layer containing the thermoplastic adhesive agent in such a manner that the adhesive layer is interposed between the sheets to give a sheet set and then pressure-bonds the sheets with the adhesive layer by applying pressure and heat to the adhesive layer.

Each step in the method according to an exemplary embodiment for manufacturing a booklet will now be described together with the corresponding component of the system according to an exemplary embodiment for manufacturing a booklet.

Attachment Step and Attachment Section

In the attachment step, adhesive agent particles are attached to an edge of sheets using the attachment section. The details of the adhesive agent particles will be described later herein.

There are no specific restrictions on the component of the attachment section for attaching the adhesive agent particles; it only needs to be a component capable of attaching the intended quantity of adhesive agent particles to the intended point on the surface of the sheets.

Specific examples of components for attaching the adhesive agent particles that can be used include a spray-type component, which sprays the adhesive agent particles, a coating-type component, which produces a coating of the adhesive agent particles, and an electrophotographic-type component, which uses the adhesive agent particles as toner.

Point to Which the Adhesive Agent Particles are Attached

The adhesive agent particles are attached to an edge of the sheets on at least one side of the sheets.

For increased bonding strength, the adhesive agent particles may be attached to an end of the sheets on both sides of the sheets.

State of Attachment of the Adhesive Agent Particles

As for the state of attachment of the adhesive agent particles, they may be in the state in which their particulate shape is maintained or may be in the form of a layer that is an assembly of the adhesive agent particles; to achieve sufficient peel strength (or adhesion after pressure bonding), it is preferred that the adhesive agent particles be in layer form.

The adhesive layers formed by the adhesive agent particles may be continuous layers or may be discontinuous layers.

The quantity of adhesive agent particles attached may be 0.5 g/m$^2$ or more and 8.0 g/m$^2$ or less so that sufficient adhesion will be achieved through pressure bonding; preferably, the quantity is 1.0 g/m$^2$ or more and 6.0 g/m$^2$ or less, more preferably 1.5 g/m$^2$ or more and 5.0 g/m$^2$ or less.

Attachment of the Adhesive Agent Particles

For the attachment of the adhesive agent particles, there are no specific restrictions as long as the adhesive agent particles are attached to the intended point; specific examples of attachment methods that can be used include spraying, in which the adhesive agent particles are sprayed, coating, in which a coating of the adhesive agent particles is produced, and electrophotography, in which the adhesive agent particles are used as toner. The adhesive agent particles may be attached by dropping them directly onto the region of the sheets in which the adhesive layers are to be formed or by roller coating.

Examples of components of the attachment section, which attaches adhesive agent particles to the sheets, for attaching the adhesive agent particles include a particle attachment device of spray type, which sprays the adhesive agent particles, a particle attachment device of coating type, which produces a coating of the adhesive agent particles, and a particle attachment device of electrophotographic type, which uses the adhesive agent particles as toner.

An attachment step based on spraying includes, for example, a step of preparing a dispersion in which the adhesive agent particles are dispersed, a step of spraying the dispersion onto the sheets, and a step of drying the dispersion sprayed onto the sheets.

An attachment section of spraying type, furthermore, includes, for example, a spray component, which sprays a dispersion of the adhesive agent particles onto the sheets, and a drying component, which dries the dispersion sprayed onto the sheets.

An example of a spray component is, for example, a sprayer. Examples of drying components include a warm-air blower, a near-infrared heater, and laser equipment.

An attachment step based on coating includes, for example, a step of applying the adhesive agent particles to the sheets. When coating is chosen, a coating liquid in which the adhesive agent particles are dispersed may be used. An attachment step based on coating in which a coating liquid is used may include, for example, a step of preparing a coating liquid in which the adhesive agent particles are dispersed, a step of applying the coating liquid to the sheets, and a step of drying the coating liquid applied onto the sheets.

An attachment section of coating type, furthermore, includes, for example, an application component, which applies the adhesive agent particles to the sheets. An attachment section of coating type that uses a coating liquid may include, for example, an application component, which applies the coating liquid to the sheets, and a drying component, which dries the coating liquid applied onto the sheets.

An example of an application component is a roller.

An attachment step based on electrophotography includes, for example, a charging step, in which the surface of an image carrier is charged, an electrostatic charge image creation step, in which an electrostatic charge image is created on the charged surface of the image carrier, a development step, in which the electrostatic charge image on the surface of the image carrier is developed into an adhesive agent particle region using an electrostatic charge image developer containing the adhesive agent particles, and a transfer step, in which the adhesive agent particle region on the surface of the image carrier is transferred to the surface of a sheet.

An attachment section of electrophotographic type, furthermore, includes an image carrier, a charging component, which charges the surface of the image carrier, an electrostatic charge image creating component, which creates an electrostatic charge image on the charged surface of the image carrier, a developing component, which contains an electrostatic charge image developer containing the adhesive agent particles and develops, using the electrostatic charge image developer, the electrostatic charge image on the surface of the image carrier into an adhesive agent particle region, and a transfer component, which transfers the adhesive agent particle region on the surface of the image carrier to the surface of a sheet.

For an attachment section of electrophotographic type, its portion including the developing component may be in a cartridge structure, which allows the portion to be detached from and attached to the particle attachment device (i.e., may be a so-called process cartridge). An example of a process cartridge is a process cartridge that includes a developing component, which contains an electrostatic charge image developer containing the adhesive agent particles, and is attached to and detached from the particle attachment device.

An attachment method based on electrophotography and an attachment section of electrophotographic type may be an image forming method based on electrophotography and an image forming apparatus of electrophotographic type and may include known steps and components employed in an image forming method based on electrophotography and an image forming apparatus of electrophotographic type.

An attachment method based on electrophotography and an attachment section of electrophotographic type, furthermore, may be of intermediate transfer type. In the intermediate transfer technique, the adhesive agent particle region formed on the surface of the image carrier is, for example, temporarily transferred to the surface of an intermediate transfer body and then, finally, transferred from the surface of the intermediate transfer body to the surface of a sheet.

Moreover, an attachment method based on electrophotography and an attachment section of electrophotographic type may be ones that include components and steps other than those described above, such as a step of and a component for cleaning the surface of the image carrier and a device that includes a static eliminator that removes static electricity from the surface of the image carrier by irradiating the surface with antistatic light.

When sheets with an image formed thereon are used, the adhesive agent particles may be attached to sheets on which the image has been formed beforehand, or an image formation step, in which the image is formed on the sheets, and the attachment step may be performed sequentially.

Examples of methods for sequentially performing an image formation step and the attachment step include the method of performing an image formation step based on inkjet recording and then the attachment step and the method of performing both of the image formation step and the attachment step by electrophotography. A specific example is the method of forming a composite image on the surface of the sheets using both a colorant for the image formation in the image formation step (e.g., a colored ink) and the adhesive agent particles in the attachment step.

Securing Step and Securing Section

In the securing step, the adhesive agent particles attached to the sheets are, for example, heated using the securing component.

There are no specific restrictions on the method for heating the adhesive agent particles (particle heating method); it only needs to be a method by which the adhesive agent particles attached to the sheets can be heated.

The method for heating the adhesive agent particles (particle heating method) may be of contact type or may be of non-contact type.

An example of a particle heating method of contact type is the method of heating a roller, belt, pad, or similar element and bringing the heated element into contact with the adhesive agent particles.

Examples of particle heating methods of non-contact type include the method of passing the sheets with the attached adhesive agent particles thereon through a region warmed with, for example, a heater or oven and the method of heating the adhesive agent particles with light radiated from, for example, a halogen lamp or xenon lamp.

In particular, it is preferred that the securing step be performed using a particle heating method of contact type because this may help limit the movement and detachment, for example, of the adhesive agent particles while heating the adhesive agent particles.

In short, the particle heating method is preferably a particle heating method of contact type.

Heating of the Adhesive Agent Particles by the Contact Technique

When the adhesive agent particles are heated by the contact technique, the pressure that is applied to the sheet set P2 with the element brought into contact with the adhesive agent particles (also referred to as the contact element) may be 0.01 MPa or more and 1 MPa or less.

When the adhesive agent particles are heated by the contact technique, the set temperature of the element brought into contact with the adhesive agent particles (also referred to as the contact element) only needs to be a temperature at which the adhesive agent particles can be plasticized; for reasons such as efficiency in the heating of the adhesive agent particles, however, it may be, for example, 120° C. or above and 250° C. or below.

In this context, the set temperature of the contact element is the target surface temperature of the surface of the contact element that comes into contact with the adhesive agent particles.

For the contact element, there are no specific restrictions as long as it is an element having a surface heated to a set temperature as described above; examples include a roller, a belt, and a pad.

The securing step may be a step of pressurizing the adhesive agent particles while heating them.

By pressurizing the adhesive agent particles while heating them, smoothness may be imparted to the surface formed by the attached adhesive agent particles (e.g., the surface of a layer of the adhesive agent particles).

An example of the pressure applied to the adhesive agent particles in the securing step is pressure applied by a fixing component of electrophotographic type.

Examples of components for pressurizing the adhesive agent particles while heating them (also referred to as heating and pressurizing elements) include the following.

That is, examples include a pair of heating and pressurizing rollers, which is two paired rollers in contact with each other, with at least one of them configured to apply heat, and applies heat and pressure to sheets with attached adhesive agent particles thereon when the sheets are passed between them; a heating and pressurizing element composed of a roller and a belt in contact with each other, with at least one of the roller and the belt configured to apply heat, which applies heat and pressure to sheets with attached adhesive agent particles thereon when the sheets are passed between the roller and the belt; and a pair of heating and pressurizing belts, which is two paired belts in contact with each other, with at least one of them configured to apply heat, and applies heat and pressure to sheets with attached adhesive agent particles thereon when the sheets are passed between them.

Pressure Bonding Step and Pressure Bonding Section

In the pressure bonding step, the multiple sheets on which an adhesive layer containing the thermoplastic adhesive agent has been formed are stacked in such a manner that the adhesive layer is interposed between the sheets to give a sheet set, and then the sheets are pressure-bonded with the adhesive layer by applying pressure and heat to the adhesive layer.

The pressurization of the sheet set may be limited to the end of the sheet set at which the adhesive layer has been formed or may involve the entire sheet set.

The component for pressurizing the sheet set (sheet set pressurizing component) only needs to be a component capable of pressurizing the sheet set in the thickness direction, with no specific restrictions imposed; it may be a component that passes the sheet set between a pair of rollers spaced apart from each other or may be a component that pressurizes the sheet set using a press machine, sealer, stapler, or similar tool.

The sheet set pressurizing component may be a commercially available device. Specific examples include PRESSLE LEADA, PRESSLE CORE, and PRESSLE Bee, manufactured by Toppan Forms Co., Ltd., and PS-500H, PS-500, EX-4100WI, EX-4100W, EX-4100/4150, and PS-100, manufactured by Duplo Seiko Corporation.

In the pressure bonding step, the sheets may be pressure-bonded with the adhesive layer by applying a pressure of 0.01 MPa or more and 1 MPa or less (preferably, 0.1 MPa or more and 0.5 MPa or less) and heat at 90° C. or above and 220° C. or below to the adhesive layer from a first surface side and a second surface side of the sheet set.

The pressure is the maximum pressure applied in the direction of the thickness of the sheet set. The temperature of the heat is the surface temperature of the element that pressurizes and heats the sheets.

By pressure-bonding the sheets with the adhesive layer under the conditions specified above, the likelihood may be increased that the strength of bonding between sheets is uniform between the first and second surface sides and the middle in the thickness direction of the booklet, with sufficient bonding strength ensured. As a result, the adhesion between the sheets may be strong, yet it may be less likely that a peeling defect (tearing or damage) occurs when a sheet is peeled away.

The pressure during the pressure bonding is measured using a commercially available pressure measurement film. A specific example of a pressure measurement film is Prescale pressure measurement film, manufactured by FUJIFILM Corporation. It should be noted that the maximum pressure mentioned earlier refers to the peak pressure observed while pressure is applied to the sheet set with the pressurizing component.

The method according to an exemplary embodiment for manufacturing a booklet may include extra steps besides the attachment, securing, and pressure bonding steps.

Examples of extra steps include a step of cutting the sheet set after the securing step or the booklet after the pressure bonding step to the desired size and a step of dividing the booklet after the pressure bonding step in the thickness direction.

Examples of Manufacturing System and Manufacturing Method

The method according to an exemplary embodiment for manufacturing a booklet will now be described through the provision of an example of a system according to an exemplary embodiment for manufacturing a booklet; these exemplary embodiments, however, are not limited to this description.

Figure 6:
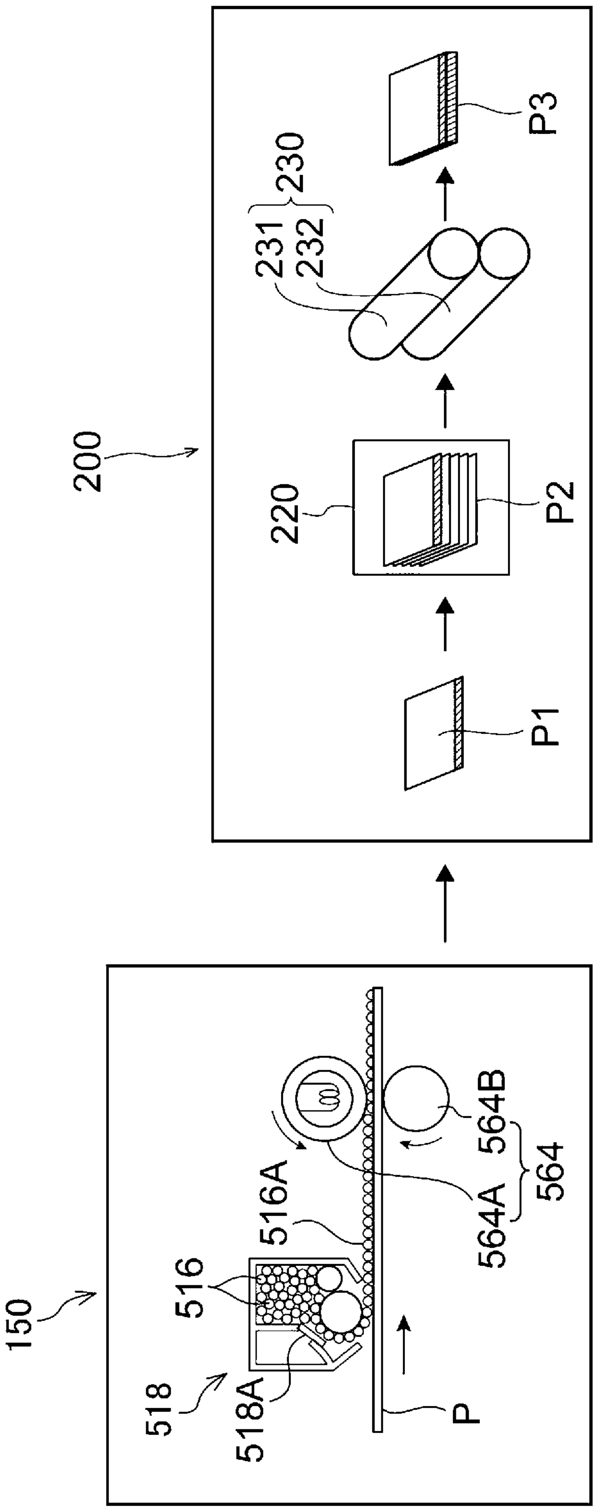
FIG. 6 is a schematic view illustrating an example of a system according to an exemplary embodiment for manufacturing a perfect-bound booklet.

FIG. 6 is a schematic view illustrating the structure of an example of a system according to an exemplary embodiment for manufacturing a booklet. The system for manufacturing a booklet illustrated in FIG. 6 includes a placing component 150 and a pressure bonding component 200 positioned downstream of the placing component 150.

The placing component 150 includes an attachment section, which contains adhesive agent particles and attaches the adhesive agent particles to an edge of a sheet, and a securing section, which secures the adhesive agent particles on the sheet.

The pressure bonding component 200 has a pressure bonding component 200 that includes a pressure bonding section, which stacks multiple sheets having an adhesive layer containing the secured adhesive agent particles in such a manner that the adhesive layer is interposed between the sheets to give a sheet set and then pressure-bonds the sheets with the adhesive layer by applying pressure and heat to the adhesive layer.

In FIG. 6, the arrows indicate the direction in which sheets are transported.

The placing component 150 is a device that places adhesive agent particles on a sheet P by coating and secures the placed adhesive agent particles. The sheet P may already have, for example, an image formed on one or both sides thereof.

As an example of its attachment section, which attaches adhesive agent particles to an end of a sheet, the placing component 150 includes a particle attachment device 518, which attaches adhesive agent particles 516 to the surface of a sheet P.

The particle attachment device 518 is a device that supplies adhesive agent particles 516 to the surface of a sheet P and allows an adhesive agent particle region 516A to form on the surface of the sheet P.

The particle attachment device 518 has feed rollers 518A in its portion facing the sheet P to limit the supply of the adhesive agent particles 516 to the corresponding coating region. Inside the particle attachment device 518, adhesive agent particles 516 are supplied to the feed rollers 518A, and the quantity of adhesive agent particles 516 supplied to the feed rollers 518A (i.e., the thickness of the layer when the adhesive agent particles 516 are supplied onto the sheet P to form a layer) is adjusted.

The securing device 564 includes a heating roller 564A, which has a built-in heat source, and a pressure roller 564B positioned to face the heating roller 564A.

The placing component 150 also includes a sheet container (not illustrated), which contains sheets P, a transport section (not illustrated), which transports the sheets P contained in the sheet container, a securing device 564, by which a coating of adhesive agent particles 516 on a sheet P is secured on the sheet P, and a sheet ejector (not illustrated), from which the sheet P on which adhesive agent particles 516 have been secured by the securing device 564 is ejected.

The operation of the placing component 150 in placing and securing adhesive agent particles on a sheet P will be described.

When a sheet P is transported from the sheet container to the point of the particle attachment device 518 by the transport section, adhesive agent particles 516 are attached onto the sheet P by the particle attachment device 518, forming an adhesive agent particle region 516A.

The sheet P on which the adhesive agent particle region 516A has been formed continues to be transported, to the securing device 564 (an example of a securing section). Then heat and pressure are applied by the securing device 564, resulting in the securing of the adhesive agent particles on the sheet P.

By passing through the placing component 150, the sheet P becomes a processed sheet P1, which has adhesive agent particles secured on its edge. The processed sheet P1 is transported for the pressure bonding component 200.

In the system according to an exemplary embodiment for manufacturing a booklet, the placing component 150 and the pressure bonding component 200 may be in a form in which they are close to each other or may be in a form in which they are distant. When the placing component 150 and the pressure bonding component 200 are distant from each other, the placing component 150 and the pressure bonding component 200 are connected by, for example, a transport component that transports the processed sheets P1 (e.g., a conveyor belt).

The pressure bonding component 200 is a component that includes a sheet set forming device 220 and a pressure device 230 and pressure-bonds a sheet set P2, which is a stack of processed sheets P1.

The sheet set forming device 220 produces a sheet set P2 by stacking multiple processed sheets P1, having adhesive agent particles secured on their edge, that pass through the device.

The sheet set P2 after leaving the sheet set forming device 220 is transported for the pressure device 230.

The pressure device 230 includes a pair of pressurizing elements (i.e., pressure rollers 231 and 232). The pressure roller 231 and the pressure roller 232 are in contact with each other at their outer surfaces while pressing against each other and apply pressure to a sheet set P2 that passes therebetween. The pair of pressurizing elements that the pressure device 230 includes is not limited to the combination of a pressure roller and a pressure roller; it may be the combination of a pressure roller and a pressure belt or the combination of a pressure belt and a pressure belt.

When pressure is applied to the sheet set P2 that passes through the pressure device 230, the adhesive agent particles fluidize on the sheet set P2 in response to the pressure, developing adhesiveness.

The pressure device 230 includes a heat source not illustrated (e.g., a halogen heater). The sheet set P2 is heated by the heat source while passing through the pressure device 230.

As a result of the passage of the sheet set P2 through the pressure device 230, surfaces facing each other are bonded together by fluidized adhesive agent particles, producing a booklet P3.

The finished booklet P3 is transported from the pressure device 230.

In the system according to an exemplary embodiment for manufacturing a booklet, the sheet set forming device 220 and the pressure device 230 may be in a form in which they are close to each other or may be in a form in which they are distant. When the sheet set forming device 220 and the pressure device 230 are distant from each other, the sheet set forming device 220 and the pressure device 230 are connected by, for example, a transport component that transports the sheet set P2 (e.g., a conveyor belt).

Figure 7:
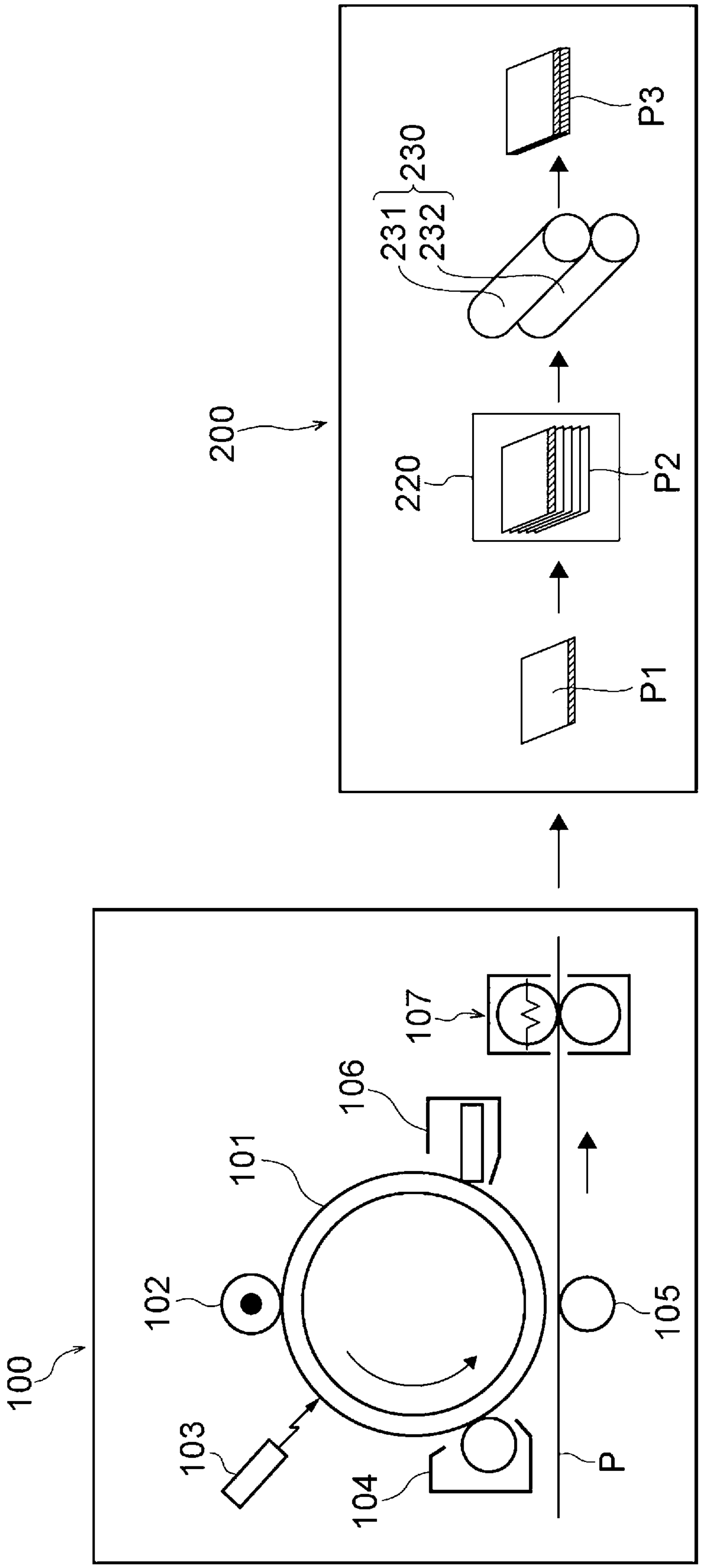
FIG. 7 is a schematic view illustrating another example of a system according to an exemplary embodiment for manufacturing a booklet.

FIG. 7 is a schematic view illustrating the structure of another example of a system according to an exemplary embodiment for manufacturing a booklet. The system for manufacturing a booklet illustrated in FIG. 7 includes a placing component 100 and a pressure bonding component 200 positioned downstream of the placing component 100.

The placing component 100 includes an attachment section, which contains adhesive agent particles and attaches the adhesive agent particles to an edge of a sheet, and a securing section, which secures the adhesive agent particles on the sheet.

The pressure bonding component 200 has a pressure bonding component 200 that includes a pressure bonding section, which stacks multiple sheets having an adhesive layer containing secured adhesive agent particles in such a manner that the adhesive layer is interposed between the sheets to give a sheet set and then pressure-bonds the sheets with the adhesive layer by applying pressure and heat to the adhesive layer.

In FIG. 7, the arrows indicate the direction in which a photoreceptor rotates or the direction in which sheets are transported.

The placing component 100 is a direct-transfer device, which places adhesive agent particles on a sheet P by electrophotography using a developer containing the adhesive agent particles. The sheet P may already have, for example, an image formed on one or both sides thereof.

The placing component 100 includes a photoreceptor 101. Around the photoreceptor 101, there are a charging roller (example of a charging component) 102, which charges the surface of the photoreceptor 101, an exposure device (example of an electrostatic charge image creating component) 103, which irradiates the charged surface of the photoreceptor 101 with a laser beam to create an electrostatic charge image, a developing device (example of a developing component) 104, which supplies adhesive agent particles to the electrostatic charge image to develop the electrostatic charge image and thereby form an adhesive agent particle region, a transfer roller (example of a transfer component) 105, which transfers the adhesive agent particle region formed through the development onto a sheet P, and a photoreceptor cleaner (example of a cleaning component) 106, which removes residual adhesive agent particles on the surface of the photoreceptor 101 after the transfer, arranged in this order.

The placing component 100, furthermore, includes a securing device 107, which secures adhesive agent particles on the sheet P, installed in it.

The securing device 107 includes, for example, a pair of securing elements (a roller/a roller or a belt/a roller). The securing device 107 also includes a heat source for heating the sheet P (e.g., a halogen heater).

The operation of the placing component 100 in placing and securing adhesive agent particles on a sheet P will be described.

First, the surface of the photoreceptor 101 is charged by the charging roller 102. The exposure device 103 irradiates the charged surface of the photoreceptor 101 with a laser beam according to image data transmitted from a controller, which is not illustrated in the drawing. As a result of this, an electrostatic charge image corresponding to the pattern in which the adhesive agent particles are to be arranged is created on the surface of the photoreceptor 101.

The electrostatic charge image created on the photoreceptor 101 rotates to a development point as the photoreceptor 101 runs. At the development point, the electrostatic charge image on the photoreceptor 101 is developed and visualized by the developing device 104, turning into an adhesive agent particle region.

Inside the developing device 104, a developer that contains at least adhesive agent particles and a carrier is contained. The adhesive agent particles have been triboelectrically charged by being stirred together with the carrier inside the developing device 104 and are held on a developer roller. As the surface of the photoreceptor 101 passes through the developing device 104, the adhesive agent particles electrostatically adhere to the electrostatic charge image on the surface of the photoreceptor 101, and the electrostatic charge image is developed by the adhesive agent particles, forming an adhesive agent particle region. The photoreceptor 101 on which an adhesive agent particle region has been formed continues running, and the adhesive agent particle region formed on the photoreceptor 101 is transported to a transfer point.

After the adhesive agent particle region on the photoreceptor 101 is transported to the transfer point, a transfer bias is applied to the transfer roller 105, and an electrostatic force in the direction from the photoreceptor 101 toward the transfer roller 105 acts on the adhesive agent particle region, causing the adhesive agent particle region on the photoreceptor 101 to be transferred onto the sheet P.

Residual adhesive agent particles on the photoreceptor 101 are removed and collected at the photoreceptor cleaner 106. The photoreceptor cleaner 106 is, for example, a cleaning blade or cleaning brush. The photoreceptor cleaner 106 may be a cleaning brush so that the phenomenon of pressure-induced fluidization of residual adhesive agent particles on the surface of the photoreceptor and subsequent adhesion of a film of the fluidized particles to the surface of the photoreceptor will be reduced.

The sheet P to which the adhesive agent particle region has been transferred is transported to the securing device 107 (an example of a securing section). Then heat and pressure are applied by the securing device 107, resulting in the securing of the adhesive agent particles on the sheet P.

By passing through the placing component 100, the sheet P becomes a processed sheet P1, which has adhesive agent particles secured on its edge. The processed sheet P1 is transported for the pressure bonding component 200. The pressure bonding component 200 in the system for manufacturing a booklet illustrated in FIG. 7 is a pressure bonding component similar to the pressure bonding component 200 in the system for manufacturing a booklet illustrated in FIG. 6.

In the system according to an exemplary embodiment for manufacturing a booklet, the placing component 100 and the pressure bonding component 200 may be in a form in which they are close to each other or may be in a form in which they are distant. When the placing component 100 and the pressure bonding component 200 are distant from each other, the placing component 100 and the pressure bonding component 200 are connected by, for example, a transport component that transports the processed sheets P1 (e.g., a conveyor belt).

The system according to an exemplary embodiment for manufacturing a booklet may include a cutting component, which cuts a sheet into predetermined dimensions. Examples of cutting components include a cutting component positioned between the placing component and the pressure bonding component, which cuts down part of a processed sheet; a cutting component positioned between the sheet set forming device and the pressure device, which cuts down part of the sheet set; and a cutting component positioned downstream of the pressure bonding component, which cuts down part of the booklet.

The system according to an exemplary embodiment for manufacturing a booklet, furthermore, may include a dividing component positioned downstream of the pressure bonding component, which divides the booklet in the thickness direction.

The system according to an exemplary embodiment for manufacturing a booklet is not limited to a cut-sheet device. A device according to an exemplary embodiment for manufacturing a booklet may be a device of a type that subjects long sheets to a placement step and a pressure bonding step to form a long booklet and then cuts the long booklet into predetermined dimensions.

The system according to an exemplary embodiment for manufacturing a booklet may further include a colored-image forming component, which forms a colored image on a sheet using a colored material. Examples of colored-image forming components include a component that forms a colored ink image on a sheet by inkjet technology, using colored ink, and a component that forms a colored toner image on a sheet by electrophotography, using a colored electrostatic charge image developer.

A colored-image forming component of inkjet type includes, for example, a liquid-ejecting head, which ejects the liquid that is the ink. The colored-image forming component of inkjet type may employ the direct ejection technique, in which the liquid-ejecting head ejects the liquid directly onto the sheet, or the intermediate transfer technique, in which the liquid-ejecting head ejects the liquid onto an intermediate transfer body, and the liquid ejected onto the intermediate transfer body is transferred to the sheet.

A colored-image forming component of electrophotographic type includes, for example:

- a photoreceptor;
- a charging component, which charges the surface of the photoreceptor;
- an electrostatic charge image creating component, which creates an electrostatic charge image on the charged surface of the photoreceptor;
- a developing component, which contains a colored electrostatic charge image developer and develops, using the colored electrostatic charge image developer, the electrostatic charge image on the surface of the photoreceptor into a colored toner image;
- a transfer component, which transfers the colored toner image on the surface of the photoreceptor to the surface of a sheet; and
- a thermal fixation component, which thermally fixes the colored toner image transferred to the surface of the sheet.

By a manufacturing system configured as described above, a manufacturing method that is a method according to an exemplary embodiment for manufacturing a booklet and further includes a colored-image formation step, in which a colored image is formed on the sheets using a colored material, is implemented. Specific examples of colored-image formation steps include a step of forming a colored ink image on a sheet by inkjet technology, using colored ink, and a step of forming a colored toner image on a sheet by electrophotography, using a colored electrostatic charge image developer.

A colored-image formation step based on inkjet technology includes, for example, a liquid ejection step, in which the liquid that is the ink is ejected. The colored-image formation step based on inkjet technology may employ the direct ejection technique, in which the liquid is ejected directly onto the recording medium, or the intermediate transfer technique, in which the liquid is ejected onto an intermediate transfer body, and the liquid ejected onto the intermediate transfer body is transferred to the sheet.

A colored-image formation step based on electrophotography includes, for example:

- a charging step, in which the surface of a photoreceptor is charged;
- an electrostatic charge image creation step, in which an electrostatic charge image is created on the charged surface of the photoreceptor;
- a development step, in which the electrostatic charge image created on the surface of the photoreceptor is developed into a colored toner image using a colored electrostatic charge image developer;
- a transfer step, in which the colored toner image formed on the surface of the photoreceptor is transferred to the surface of a sheet; and
- a thermal fixation step, in which the colored toner image transferred to the surface of the sheet is thermally fixed.

A colored-image forming component that the system according to an exemplary embodiment for manufacturing a booklet includes is a device such as: a direct-type device, which forms the colored image directly on the sheet; an intermediate-transfer device, which forms the colored image on the surface of an intermediate transfer body and transfers the colored image on the surface of the intermediate transfer body to the surface of the sheet; a device that includes a cleaning component that cleans the surface of the photoreceptor between the transfer of the colored image and charging (for when the colored image is a colored toner image); a device that includes a static eliminator that removes static electricity from the surface of the photoreceptor by irradiating the surface with antistatic light between the transfer of the colored image and charging (for when the colored image is a colored toner image). When a colored-image forming component of electrophotographic type is an intermediate-transfer device, its transfer component includes, for example, an intermediate transfer body, the surface of which is for the colored toner image to be transferred to, a first transfer component, which transfers the colored toner image on the surface of the photoreceptor to the surface of the intermediate transfer body (first transfer), and a second transfer component, which transfers the colored toner image on the surface of the intermediate transfer body to the surface of the sheet (second transfer).

When a component for placing adhesive agent particles and a colored-image forming component are of intermediate-transfer type in the system according to an exemplary embodiment for manufacturing a booklet, the placing component and the colored-image forming component may share an intermediate transfer body and a transfer component.

When a colored-image forming component includes a securing device, which bonds the colored material to the sheet, in the system according to an exemplary embodiment for manufacturing a booklet, a securing device in a component for placing adhesive agent particles and the securing device in the colored-image forming component may be one shared securing device.

Thermoplastic Adhesive Agent

As the thermoplastic adhesive agent, an adhesive agent that plasticizes when heated is employed.

The thermoplastic adhesive agent may be a pressure-induced phase transition adhesive agent in particular. When the thermoplastic adhesive agent is a pressure-induced phase transition adhesive agent, pressure can be used for bonding together with heat; it may, therefore, be more likely that the strength of bonding between sheets is uniform between the first and second surface sides and the middle in the thickness direction of the booklet, with sufficient bonding strength ensured. As a result, the adhesion between the sheets may be strong, yet it may be less likely that a peeling defect (tearing or damage) occurs when a sheet is peeled away.

A pressure-induced phase transition adhesive agent is an adhesive agent that undergoes phase transition in response to pressure; specifically, it is an adhesive agent that satisfies formula 1 below.

$$10^\circ\ \text{C.} \leq T1 - T2 \qquad \text{Formula 1}$$

In formula 1, T1 is a temperature at which the adhesive agent exhibits a viscosity of 10000 Pa·s under a pressure of 1 MPa, and T2 is a temperature at which the adhesive agent exhibits a viscosity of 10000 Pa·s under a pressure of 10 MPa. The method for determining temperatures T1 and T2 will be stated later herein.

Specifically, the thermoplastic adhesive agent may be a pressure-induced phase transition adhesive agent that contains at least two resins with different glass transition temperatures, with the difference between the lowest and highest of the glass transition temperatures of the at least two resins being 30° C. or greater.

When a pressure-induced phase transition adhesive agent having these characteristics is employed, it may be more likely that the strength of bonding between sheets is uniform between the first and second surface sides and the middle in the thickness direction of the booklet, with sufficient bonding strength ensured. As a result, the adhesion between the sheets may be strong, yet it may be less likely that a peeling defect (tearing or damage) occurs when a sheet is peeled away.

An example of a pressure-induced phase transition adhesive agent having the characteristics specified above is an adhesive agent that contains a styrene resin whose monomer components include styrene and at least one other vinyl monomer and a (meth)acrylate resin whose monomer components include at least two (meth)acrylates, with the percentage by mass of (meth)acrylates to all monomer components being 90% by mass or more.

The details of the thermoplastic adhesive agent will now be described. In the following description, adhesive agent particles for forming adhesive layers containing the thermoplastic adhesive agent (hereinafter also referred to as "adhesive agent particles according to an exemplary embodiment") will be described. The composition and characteristics of the adhesive agent particles are the same as the composition and characteristics of the adhesive agent.

The adhesive agent particles according to an exemplary embodiment contain at least a base particle and optionally include external additives.

Base Particle

Binder Resins

The base particle may contain, as binder resins, a styrene resin whose monomer components include styrene and at least one other vinyl monomer and a (meth)acrylate resin whose monomer components include at least two (meth) acrylates, with the percentage by mass of (meth)acrylates to all monomer components being 90% by mass or more.

Hereinafter, "a styrene resin whose monomer components include styrene and at least one other vinyl monomer" may also be referred to as "a specified styrene resin," and "a (meth)acrylate resin whose monomer components include at least two (meth)acrylates, with the percentage by mass of (meth)acrylates to all monomer components being 90% by mass or more" may also be referred to as "a specified (meth)acrylate resin."

For the base particle, the amount of the specified styrene resin may be greater than the amount of the specified (meth)acrylate resin so that adhesiveness after pressure bonding will be maintained. The amount of the specified styrene resin may be 55% by mass or more and 80% by mass or less, preferably 60% by mass or more and 75% by mass or less, more preferably 65% by mass or more and 70% by mass or less in relation to the total amount of the specified styrene resin and the specified (meth)acrylate resin.

Specified Styrene Resin

The base particle as a component of the adhesive agent particles contains a specified styrene resin, whose monomer components include styrene and at least one other vinyl monomer.

The percentage by mass of styrene to all monomer components in the specified styrene resin may be 60% by mass or more so that fluidization of the adhesive agent particles without applied pressure will be limited; preferably, the percentage is 70% by mass or more, more preferably 75% by mass or more.

The percentage by mass of styrene to all monomer components in the specified styrene resin may be 95% by mass or less so that adhesive agent particles that readily undergo phase transition in response to pressure will be formed; preferably, the percentage is 90% by mass or less, more preferably 85% by mass or less.

The percentage by mass of styrene to all monomer components in the specified styrene resin, therefore, may be 60% by mass or more and 95% by mass or less.

Examples of vinyl monomers other than styrene that can be included in the monomer components of the specified styrene resin (hereinafter also referred to as extra vinyl monomers) include styrene monomers and acrylic monomers.

Examples of styrene monomers as a category of extra vinyl monomers include vinylnaphthalene; alkyl-substituted styrenes, such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes, such as p-phenylstyrene; alkoxy-substituted styrenes, such as p-methoxystyrene; halogen-substituted styrenes, such as p-chlorostyerene, 3,4-dichlorostyrene, p-fluorostyrene, and 2,5-difluorostyrene; and nitro-substituted styrenes, such as m-nitrostyrene, o-nitrostyrene, and p-nitrostyrene.

One such styrene monomer may be used alone, or two or more may be used in combination.

As for acrylic monomers as a category of extra vinyl monomers, at least one acrylic monomer selected from the group consisting of (meth)acrylic acid and (meth)acrylates may be used. Examples of (meth)acrylates include alkyl (meth)acrylates, carboxy-substituted alkyl (meth)acrylates, hydroxy-substituted alkyl (meth)acrylates, alkoxy-substituted alkyl (meth)acrylates, and di(meth)acrylates.

One such acrylic monomer may be used alone, or two or more may be used in combination.

Besides styrene monomers and acrylic monomers, examples of extra vinyl monomers that can be included in the monomer components of the specified styrene resin also include (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene.

The percentage by mass of (meth)acrylates to all monomer components in the specified styrene resin may be 40% by mass or less so that fluidization of the adhesive agent particles without applied pressure will be limited; preferably, the percentage is 30% by mass or less, more preferably 25% by mass or less; in order for adhesive agent particles that easily undergo phase transition in response to pressure to be formed, furthermore, the percentage may be 5% by mass or more, preferably 10% by mass or more, more preferably 15% by mass or more. The (meth)acrylates in this context may be alkyl (meth)acrylates, preferably alkyl (meth)acrylates in which the number of carbons in the alkyl group is two or more and ten or fewer, more preferably alkyl (meth)acrylates in which the number of carbons in the alkyl group is four or more and eight or fewer.

The specified styrene resin may contain at least one of n-butyl acrylate or 2-ethylhexyl acrylate as its monomer component, and the total amount of n-butyl acrylate and 2-ethylhexyl acrylate to all monomer components in the styrene resin may be 40% by mass or less so that fluidization of the particles without applied pressure will be limited; preferably, the total amount is 30% by mass or less, more preferably 25% by mass or less; in order for adhesive agent particles that easily undergo phase transition in response to pressure to be formed, furthermore, the total amount may be 5% by mass or more, preferably 10% by mass or more, more preferably 15% by mass or more.

The weight-average molecular weight of the specified styrene resin may be 3000 or more so that fluidization of the adhesive agent particles without applied pressure will be limited; preferably, the weight-average molecular weight is 4000 or more, more preferably 5000 or more; in order for adhesive agent particles that easily undergo phase transition in response to pressure to be formed, furthermore, the weight-average molecular weight may be 60000 or less, preferably 55000 or less, more preferably 50000 or less.

The weight-average molecular weight of the resins is measured by gel permeation chromatography (GPC). The molecular weight measurement by GPC is performed using HLC-8120 GPC, manufactured by Tosoh Corporation, as the GPC system, TSKgel SuperHM-M (15 cm), manufactured by Tosoh Corporation, as the column, and tetrahydrofuran as the eluent. The weight-average molecular weight of the resins is calculated using a molecular-weight calibration curve constructed using monodisperse polystyrene standards.

The glass transition temperature of the specified styrene resin may be 30° C. or above so that fluidization of the adhesive agent particles without applied pressure will be limited; preferably, the glass transition temperature is 40° C. or above, more preferably 50° C. or above; in order for adhesive agent particles that easily undergo phase transition in response to pressure to be formed, furthermore, the glass transition temperature may be 110° C. or below, preferably 100° C. or below, more preferably 90° C. or below.

The glass transition temperature of the resins is determined from a differential scanning calorimetry curve (DSC curve) obtained by performing differential scanning calorimetry (DSC). More specifically, it is determined as an extrapolated glass transition starting temperature as described in the methods for determining glass transition temperatures in JIS K7121:1987, "Testing Methods for Transition Temperatures of Plastics."

The glass transition temperature of a resin is controlled by the types of its monomer components and their percentages in polymerization. The glass transition temperature tends to be lower with increasing density of flexible units, such as methylene groups, ethylene groups, and oxyethylene groups, contained in the backbone and higher with increasing density of rigid units, such as aromatic rings and cyclohexane rings, contained in the backbone. The glass transition temperature, furthermore, tends to be lower with increasing density of pendant aliphatic groups.

The percentage by mass of the specified styrene resin in the base particle as a whole may be 55% by mass or more so that fluidization of the adhesive agent particles without applied pressure will be limited; preferably, the percentage is 60% by mass or more, more preferably 65% by mass or more; in order for adhesive agent particles that easily undergo phase transition in response to pressure to be formed, furthermore, the percentage may be 80% by mass or less, preferably 75% by mass or less, more preferably 70% by mass or less.

Specified (Meth)Acrylate Resin

The base particle as a component of the adhesive agent particles may contain a (meth)acrylate resin whose monomer components include at least two (meth)acrylates, with the percentage by mass of (meth)acrylates to all monomer components being 90% by mass or more.

The percentage by mass of (meth)acrylates to all monomer components in the (meth)acrylate resin is 90% by mass or more and may be 95% by mass or more, preferably 98% by mass or more, more preferably 100% by mass.

Examples of (meth)acrylates include alkyl (meth)acrylates, carboxy-substituted alkyl (meth)acrylates, hydroxy-substituted alkyl (meth)acrylates, alkoxy-substituted alkyl (meth)acrylates, and di(meth)acrylates.

The percentage by mass of alkyl (meth)acrylates to all monomer components in the specified (meth)acrylate resin may be 90% by mass or more so that adhesive agent particles that easily undergo phase transition in response to pressure and are superior in adhesiveness after pressure bonding will be formed; preferably, the percentage is 95% by mass or more, more preferably 98% by mass or more, even more preferably 100% by mass. The alkyl (meth) acrylates in this context may be alkyl (meth)acrylates in which the number of carbons in the alkyl group is two or more and ten or fewer, preferably alkyl (meth)acrylates in which the number of carbons in the alkyl group is four or more and eight or fewer.

Of the at least two (meth)acrylates contained as monomer components in the specified (meth)acrylate resin, the two with the highest percentages by mass may be present in a ratio by mass of 80:20 to 20:80 so that adhesive agent particles that easily undergo phase transition in response to pressure and are superior in adhesiveness after pressure bonding will be formed; preferably, the ratio by mass is from 70:30 to 30:70, more preferably from 60:40 to 40:60.

Of the at least two (meth)acrylates contained as monomer components in the specified (meth)acrylate resin, the two with the highest percentages by mass may be alkyl (meth) acrylates. The alkyl (meth)acrylates in this context may be alkyl (meth)acrylates in which the number of carbons in the alkyl group is two or more and ten or fewer, preferably alkyl (meth)acrylates in which the number of carbons in the alkyl group is four or more and eight or fewer.

When the two with the highest percentages by mass of the at least two (meth)acrylates contained as monomer components in the specified (meth)acrylate resin are alkyl (meth) acrylates, the number of carbons in the alkyl group in these two (meth)acrylates may be one or more and four or fewer so that adhesive agent particles that easily undergo phase transition in response to pressure and are superior in adhesiveness after pressure bonding will be formed; preferably, the number of carbons is two or more and four or fewer, more preferably three or four.

The specified (meth)acrylate resin may contain n-butyl acrylate and 2-ethylhexyl acrylate as its monomer components so that adhesive agent particles that easily undergo phase transition in response to pressure and are superior in adhesiveness after pressure bonding will be formed; in particular, the two with the highest percentages by mass of the at least two (meth)acrylates contained as monomer components in the (meth)acrylate resin may be n-butyl acrylate and 2-ethylhexyl acrylate. The total amount of n-butyl acrylate and 2-ethylhexyl acrylate to all monomer components in the (meth)acrylate resin may be 90% by mass or more, preferably 95% by mass or more, more preferably 98% by mass or more, even more preferably 100% by mass.

The monomer components of the specified (meth)acrylate resin may include vinyl monomers other than (meth)acrylates.

Examples of vinyl monomers other than (meth)acrylates include (meth)acrylic acid; styrene; styrene monomers other than styrene; (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene. One such vinyl monomer may be used alone, or two or more may be used in combination.

When the monomer components of the specified (meth) acrylate resin include one or more vinyl monomers other than (meth)acrylates, the vinyl monomers other than (meth) acrylates may be at least one of acrylic acid or methacrylic acid, preferably acrylic acid.

The weight-average molecular weight of the specified (meth)acrylate resin may be 100,000 or more so that fluidization of the particles without applied pressure will be limited; preferably, the weight-average molecular weight is 120,000 or more, more preferably 150,000 or more; in order for particles that easily undergo phase transition in response to pressure to be formed, furthermore, the weight-average molecular weight may be 250,000 or less, preferably 220,000 or less, more preferably 200,000 or less.

The glass transition temperature of the specified (meth) acrylate resin may be 10° C. or below so that particles that easily undergo phase transition in response to pressure will be formed; preferably, the glass transition temperature is 0° C. or below, more preferably −10° C. or below; in order for fluidization of the particles without applied pressure to be limited, furthermore, the glass transition temperature may be −90° C. or above, preferably −80° C. or above, more preferably −70° C. or above.

In an exemplary embodiment, the percentage by mass of the specified (meth)acrylate resin in the base particle as a whole may be 20% by mass or more so that particles that easily undergo phase transition in response to pressure will be formed; preferably, the percentage is 25% by mass or more, more preferably 30% by mass or more; in order for fluidization of the particles without applied pressure to be limited, furthermore, the percentage may be 45% by mass or less, preferably 40% by mass or less, more preferably 35% by mass or less.

In an exemplary embodiment, the total amount of the specified styrene resin and specified (meth)acrylate resin contained in the base particle may be 70% by mass or more, preferably 80% by mass or more, more preferably 90% by mass or more, even more preferably 95% by mass or more, still more preferably 100% by mass in relation to the base particle as a whole.

The base particle may optionally contain, for example, polystyrene; non-vinyl resins, such as epoxy resins, polyester resins, polyurethane resins, polyamide resins, cellulose resins, polyether resins, and modified rosin; or other resins.

One such resin may be used alone, or two or more may be used in combination.

Extra Constituents

The base particle may optionally contain extra constituents.

Examples of extra constituents include coloring agents (e.g., pigments and dyes), release agents (e.g., hydrocarbon waxes; natural waxes, such as carnauba wax, rice bran wax, and candelilla wax; synthesized or mineral/petroleum waxes, such as montan wax; and ester waxes, such as fatty acid esters and montanates), and charge control agents.

The base particle may contain a coloring agent unless it impairs the visibility of images.

A smaller amount of the coloring agent in the base particle may help enhance the transparency of the adhesive agent particles. Specifically, the amount of the coloring agent may be 1.0% by mass or less, preferably 0.1% by mass or less, more preferably 0.01% by mass or less in relation to the base particle as a whole; the base particle may be devoid of coloring agents. It should be noted that the base particle may be transparent.

Being “transparent” means that the average transmittance of light in the visible spectrum (400 nm to 700 nm) through a region to which the adhesive agent particles have been attached is 10% or more; the average transmittance may be 50% or more, preferably 80% or more, more preferably 90% or more.

This average transmittance is measured using V700 spectrophotometer (manufactured by JASCO Corporation).

Structure of the Base Particle

The internal structure of the base particle may be a sea-island structure.

The sea-island structure may be a sea-island structure that has a sea phase containing one of the two or more binder resins and an island phase dispersed in the sea phase and containing the other. More specifically, it may be a sea-island structure that has a sea phase containing the specified styrene resin and an island phase dispersed in the sea phase and containing the specified (meth)acrylate resin so that phase transition in response to pressure will be encouraged. The details of the specified styrene resin contained in the sea phase and the (meth)acrylate resin contained in the island phase are as already stated. An island phase containing no (meth)acrylate resin may be dispersed in the sea phase.

The base particle may be a base particle in a single-layer structure or may be a base particle in a core-shell structure, which has a core portion and a shell layer covering the core portion. Preferably, the base particle is in a core-shell structure so that fluidization of the adhesive agent particles without applied pressure will be limited.

When the base particle has a core-shell structure, the core portion may contain the specified styrene resin and the specified (meth)acrylate resin so that phase transition in response to pressure will be encouraged. In order for fluidization of the adhesive agent particles without applied pressure to be limited, furthermore, the shell layer may contain the specified styrene resin.

When the base particle has a core-shell structure, the core portion may include a sea phase containing the specified styrene resin and an island phase dispersed in the sea phase and containing the specified (meth)acrylate resin. The average diameter of the island phase may be in the range specified above. The core portion may have the above structure, and, in addition to that, the shell layer may contain the specified styrene resin. In that case, the continuous structure formed by the sea phase in the core portion and the shell layer may encourage phase transition of the base particle in response to pressure.

Examples of resins that can be contained in the shell layer also include polystyrene; non-vinyl resins, such as epoxy resins, polyester resins, polyurethane resins, polyamide resins, cellulose resins, polyether resins, and modified rosin; and other resins.

One such resin may be used alone, or two or more may be used in combination.

The volume-average particle diameter (D50v) of the base particle may be 4 μm or more for easier handling of the base particle; preferably, the D50v is 5 μm or more, more preferably 6 μm or more. The volume-average particle diameter of the base particle may be 15 μm or less, preferably 12 μm or less, more preferably 10 μm or less.

The volume-average particle diameter (D50v) of the base particle is measured using Coulter Multisizer II (manufactured by Beckman Coulter, Inc.) and an aperture with a size of 100 μm. Base particles weighing 0.5 mg or more and 50 mg or less are added to and dispersed in 2 mL of a 5% by mass aqueous solution of a sodium alkylbenzene sulfonate, then the resulting dispersion is mixed with 100 mL or more and 150 mL or less of electrolyte (ISOTON-II, manufactured by Beckman Coulter, Inc.), dispersion treatment is carried out for 1 minute using a sonicator, and the resulting dispersion is used as the sample. The diameter of 50000 particles with a diameter of 2 μm or more and 60 μm or less in the sample is measured. In a size distribution by volume plotted starting from the smallest diameter, the particle diameter at which the cumulative volume is 50% is reported as the volume-average particle diameter (D50v).

External Additives

An example of an external additive is inorganic particles. Examples of inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)n$, $Al_2O_3{\cdot}2SiO_2$, $CaCO_3$, $MgCO_3$, $BaSO_4$, and $MgSO_4$.

The surface of inorganic particles used as an external additive may have been treated by hydrophobization. The hydrophobization is performed by, for example, immersing the inorganic particles in at least one hydrophobizing agent. The hydrophobizing agent is not particularly limited, but examples include silane coupling agents, silicone oils, titanate coupling agents, and aluminum coupling agents. One such hydrophobizing agent may be used alone, or two or more may be used in combination. The amount of the hydrophobizing agent is, for example, 1 part by mass or more and 10 parts by mass or less per 100 parts by mass of the inorganic particles.

Examples of external additives also include resin particles (particles of, for example, polystyrene, polymethyl methacrylate, or melamine resin) and active cleaning agents (e.g., metal salts of higher fatty acids, typically zinc stearate, and particles of fluoropolymers).

The amount of the external additives may be 0.01% by mass or more and 5% by mass or less, preferably 0.01% by mass or more and 2.0% by mass or less, in relation to the base particle.

Characteristics of the Adhesive Agent Particles

The adhesive agent particles (their base particle) may contain at least two resins with different with different glass transition temperatures.

The adhesive agent particles may contain three or more resins with different glass transition temperatures but preferably contains two resins.

As stated above, the two resins may be a specified styrene resin and a specified (meth)acrylate resin. Extra resins, other than specified styrene resins and specified (meth)acrylate resins, may be contained. The amount of the extra resins, however, may be 5% by mass or less in relation to the adhesive agent particles (their base particle) as a whole.

The difference between the lowest and highest of the glass transition temperatures of the at least two resins may be 30° C. or greater. The difference between the lowest glass transition temperature and the highest glass transition temperature may be 40° C. or greater so that the particles will readily undergo phase transition in response to pressure; preferably, the difference is 50° C. or greater, more preferably 60° C. or greater. As for the upper limit, the difference between the lowest glass transition temperature and the highest glass transition temperature is, for example, 140° C. or less, 130° C. or less, or 120° C. or less.

The lowest glass transition temperature may be 10° C. or below so that the particles will readily undergo phase transition in response to pressure; preferably, the lowest glass transition temperature is 0° C. or below, more preferably −10° C. or below; in order for fluidization of the particles without applied pressure to be limited, furthermore, the lowest glass transition temperature may be −90° C. or above, preferably −80° C. or above, more preferably −70° C. or above.

The highest glass transition temperature may be 30° C. or above so that fluidization of the particles without applied pressure will be limited; preferably, the highest glass transition temperature is 40° C. or above, more preferably 50° C. or above; in order for the particles to readily undergo phase transition in response to pressure, furthermore, the highest glass transition temperature may be 70° C. or below, preferably 65° C. or below, more preferably 60° C. or below. The glass transition temperatures can be determined from the adhesive agent particles.

A sheet-shaped sample is prepared by compressing the adhesive agent particles, and the glass transition temperatures are determined from a differential scanning calorimetry curve (DSC curve) obtained by performing differential scanning calorimetry (DSC). More specifically, they are determined as extrapolated glass transition starting temperatures as described in the methods for determining glass transition temperatures in JIS K7121:1987, "Testing Methods for Transition Temperatures of Plastics."

The adhesive agent particles may be particles that undergo phase transition in response to pressure and may satisfy formula 1 below.

$$10° \text{ C.} \leq T1-T2 \qquad \text{Formula 1}$$

In formula 1, T1 is a temperature at which the particles exhibit a viscosity of 10000 Pa·s under a pressure of 1 MPa, and T2 is a temperature at which the particles exhibit a viscosity of 10000 Pa·s under a pressure of 10 MPa. The method for determining temperatures T1 and T2 will be stated later herein.

The temperature difference (T1−T2) is 10° C. or greater so that the particles will readily undergo phase transition in response to pressure; the temperature difference may be 15° C. or greater, preferably 20° C. or greater; in order for fluidization of the particles without applied pressure to be limited, furthermore, the temperature difference may be 120° C. or less, preferably 100° C. or less, more preferably 80° C. or less.

The value of T1 may be 140° C. or less, preferably 130° C. or less, more preferably 120° C. or less, even more preferably 115° C. or less. As for the lower limit, temperature T1 may be 80° C. or above, preferably 85° C. or above.

The value of T2 may be 40° C. or greater, preferably 50° C. or greater, more preferably 60° C. or greater. As for the upper limit, temperature T2 may be 85° C. or below.

An example of a measure for the likelihood of the adhesive agent particles to undergo phase transition in response to pressure is a temperature difference (T1−T3), which is the difference between temperature T1, at which the particles exhibit a viscosity of 10000 Pa·s under a pressure of 1 MPa, and a temperature T3 at which the particles exhibit a viscosity of 10000 Pa·s at a pressure of 4 MPa, and the temperature difference (T1−T3) may be 5° C. or greater. The temperature difference (T1−T3) is typically 25° C. or less.

For the adhesive agent particles, the temperature difference (T1−T3) may be 5° C. or greater, preferably 10° C. or greater, so that phase transition in response to pressure will be encouraged.

As for the upper limit, the temperature difference (T1−T3) is typically 25° C. or less.

For the adhesive agent particles, temperature T3, at which the particles exhibit a viscosity of 10000 Pa·s under a pressure of 4 MPa, may be 90° C. or below so that the temperature difference (T1−T3) will be 5° C. or greater; preferably, temperature T3 is 85° C. or below, more preferably 80° C. or below. As for the lower limit, temperature T3 may be 60° C. or above.

The method for determining temperatures T1, T2, and T3 are as follows.

A sample in pellet form is prepared by compressing the adhesive agent particles. The sample in pellet form is set into a flow tester (manufactured by Shimadzu Corporation; CFT-500), the applied pressure is fixed at 1 MPa, and viscosity versus temperature at 1 MPa is measured. From the obtained viscosity graph, temperature T1, at which the viscosity is 104 Pa·s at an applied pressure of 1 MPa, is determined. Temperature T2 is determined in the same manner as in the method for temperature T1, except that the applied pressure of 1 MPa is changed to 10 MPa. Temperature T3 is determined in the same manner as in the method for temperature T1, except that the applied pressure of 1 MPa is changed to 4 MPa. From temperatures T1 and T2, the temperature difference (T1−T2) is calculated. From temperatures T1 and T3, the temperature difference (T1−T3) is calculated.

Method for Manufacturing the Adhesive Agent Particles

The adhesive agent particles are obtained by producing the base particles and then adding external additives to the base particles.

The base particles may be produced by either a dry process (e.g., kneading and milling) or a wet process (e.g., aggregation and coalescence, suspension polymerization, or dissolution and suspension). There are no specific restrictions on these processes; known processes are employed. Of these, aggregation and coalescence, in particular, may be used to obtain the base particles.

In the following, a method for producing the base particles by aggregation and coalescence is presented as an example.

When the base particles are produced by aggregation and coalescence, the base particles are produced through, for example:

- a step of preparing a styrene resin particle dispersion, a dispersion in which styrene resin particles containing a specified styrene resin have been dispersed (styrene resin particle dispersion preparation step);
- a step of polymerizing monomers into a specified (meth) acrylate resin in the styrene resin particle dispersion to form composite resin particles that contain a specified styrene resin and a specified (meth)acrylate resin (composite resin particle formation step);
- a step of causing the composite resin particles in the composite resin particle dispersion, in which the composite resin particles are dispersed, to aggregate together to form aggregates (aggregate formation step); and
- a step of heating the aggregate dispersion, in which the aggregates are dispersed, to cause the aggregates to fuse and coalesce together and thereby to form base particles (fusion and coalescence step).

The adhesive agent particles may be used by coating them onto a surface directly or may be used as an electrostatic charge image developer. The electrostatic charge image developer may be a one-component developer, which consists substantially of the adhesive agent particles, or may be a two-component developer, which is a mixture of the adhesive agent particles and a carrier.

For the carrier, there are no specific restrictions on it, and examples include known carriers. Examples of carriers include a coated carrier, which is obtained by covering the surface of a core material that is a magnetic powder with resin; a magnetic powder-dispersed carrier, which is a mixture of a matrix resin and a magnetic powder dispersed in it; and a resin-impregnated carrier, which is obtained by impregnating a porous magnetic powder with resin. The magnetic powder-dispersed and resin-impregnated carriers may be carriers obtained by using the particles forming the carrier as a core material and covering their surface with resin.

Examples of magnetic powders include powders of magnetic metals, such as iron, nickel, and cobalt; and powders of magnetic oxides, such as ferrite and magnetite.

For the resin for covering a core material and the matrix resin, examples include polyethylene, polypropylene, polystyrene, polyvinyl acetate, polyvinyl alcohol, polyvinyl butyral, polyvinyl chloride, polyvinyl ethers, polyvinyl ketones, vinyl chloride-vinyl acetate copolymers, styrene-acrylate copolymers, straight silicone resins, which contain organosiloxane bonds in them, or their modified forms, fluoropolymers, polyesters, polycarbonates, phenolic resins, and epoxy resins. The resin for covering a core material and the matrix resin may be formulated to contain additives, such as electrically conductive particles. Examples of electrically conductive particles include particles of metals, such as gold, silver, and copper, and particles of materials like carbon black, titanium oxide, zinc oxide, tin oxide, barium sulfate, aluminum borate, and potassium titanate.

An example of a method for covering the surface of a core material with resin is the method of covering the surface with a coating-layer formation solution, a solution obtained by dissolving the covering resin and additives (used optionally) in an appropriate solvent. The solvent is not particularly limited; it can be selected considering, for example, the type of resin used and its suitability for coating.

Specific examples of methods for covering a core material with resin include dipping, in which the core material is dipped into the coating-layer formation solution; spraying, in which the coating-layer formation solution is sprayed onto the surface of the core material; fluidized bed coating, in which the coating-layer formation solution is sprayed with the core material floated in fluidized air; and kneader-coater coating, in which the core material for the carrier and the coating-layer formation solution are mixed together in a kneader-coater, and then the solvent is peeled away.

The mix ratio (ratio by mass) between the adhesive agent particles and the carrier in a two-component developer may be from 1:100 (particles:carrier) to 30:100, preferably from 3:100 to 20:100.

EXAMPLES

Exemplary embodiments of the disclosure will now be described in detail by examples; exemplary embodiments of the disclosure, however, are not limited to these examples. In the following description, "parts" and "%" are by mass unless stated otherwise.

Preparation of a Dispersion Containing Styrene Resin Particles

Preparation of Styrene Resin Particle Dispersion (St1)

- Styrene: 390 parts
- n-Butyl acrylate: 100 parts
- Acrylic acid: 10 parts
- Dodecanethiol: 7.5 parts By mixing these materials until dissolution, a monomer solution is prepared.

Eight parts of an anionic surfactant (manufactured by The Dow Chemical Company; Dowfax 2A1) is dissolved in 205 parts of deionized water, the monomer solution is added, and dispersion and emulsification are carried out to give an emulsion.

A 2.2-part fraction of an anionic surfactant (manufactured by The Dow Chemical Company; Dowfax 2A1) is dissolved in 462 parts of deionized water, the resulting solution is loaded into a polymerization flask equipped with a stirrer, a thermometer, a reflux condenser, and a nitrogen gas tube, and the solution is heated to 73° C. and maintained at that temperature with stirring.

Three parts of ammonium persulfate is dissolved in 21 parts of deionized water, the resulting solution is added dropwise into the polymerization flask over 15 minutes using a metering pump, and then the emulsion is added dropwise over 160 minutes using a metering pump.

Subsequently, the polymerization flask is maintained at 75° C. for 3 hours while gentle stirring is continued, and then the flask is returned to room temperature (25° C.).

This gives a styrene resin particle dispersion (St1) that contains styrene resin particles and in which the volume-average particle diameter (D50v) of the resin particles is 174 nm, the weight-average molecular weight determined by GPC (UV detection) is 49k, the glass transition temperature is 54° C., and the solids content is 42%.

The styrene resin particles are isolated by drying styrene resin particle dispersion (St1), and when their thermal behavior in the range of temperatures from −100° C. to 100° C. is analyzed using a differential scanning calorimeter (manufactured by Shimadzu Corporation; DSC-60A), one glass transition temperature is observed. The glass transition temperature is 54° C.

Preparation of a Dispersion Containing Composite Resin Particles

Preparation of Composite Resin Particle Dispersion (M1)

- Styrene resin particle dispersion (St1): 1190 parts (solids content, 500 parts)
- 2-Ethylhexyl acrylate: 250 parts
- n-Butyl acrylate: 250 parts
- Deionized water: 982 parts These materials are loaded into a polymerization flask, stirred for 1 hour at 25° C., and then heated to 70° C.

A 2.5-part fraction of ammonium persulfate is dissolved in 75 parts of deionized water, and the resulting solution is added dropwise into the polymerization flask over 60 minutes using a metering pump.

Subsequently, the polymerization flask is maintained at 70° C. for 3 hours while gentle stirring is continued, and then the flask is returned to room temperature (25° C.).

This gives a composite resin particle dispersion (M1) that contains composite resin particles and in which the volume-average particle diameter (D50v) of the resin particles is 219 nm, the weight-average molecular weight determined by GPC (UV detection) is 219k, and the solids content is 32%.

The composite resin particles are isolated by drying composite resin particle dispersion (M1), and when their thermal behavior in the range of temperatures from −150° C. to 100° C. is analyzed using a differential scanning calorimeter (manufactured by Shimadzu Corporation; DSC-60A), two glass transition temperatures are observed. The glass transition temperatures are −52° C. and 54° C.

In addition, the ratio by mass between styrene resins and (meth)acrylate resins in the composite resin particles is 50:50.

Preparation of Adhesive Agent Particles

Preparation of Adhesive Agent Particles (1) and Developer (1)

Composite resin particle dispersion (M1): 504 parts

Deionized water: 710 parts

Anionic surfactant (manufactured by The Dow Chemical Company; Dowfax 2A1): 1 part These materials are put into a reaction vessel equipped with a thermometer and a pH meter, the pH is adjusted to 3.0 by adding a 1.0% aqueous solution of nitric acid at a temperature of 25° C., and then 23 parts of a 2.0% aqueous solution of aluminum sulfate is added while dispersion is carried out at a rotational frequency of 5000 rpm using a homogenizer (manufactured by IKA-Werke GmbH & CO. KG; ULTRA-TURRAX T50). Subsequently, a stirrer and a heating mantle are attached to the reaction vessel, the temperature is increased at a rate of 0.2° C./min until a temperature of 40° C. and at a rate of 0.05° C./min beyond 40° C., and the particle diameter is measured using Multisizer II (aperture size, 50 μm; manufactured by Beckman Coulter, Inc.) every 10 minutes. When the volume-average particle diameter reaches 5.0 μm, the temperature is held, and 170 parts of styrene resin particle dispersion (St1) is added over 5 minutes. After the end of addition, the mixture is maintained at 50° C. for 30 minutes, and then the pH of the resulting slurry is adjusted to 6.0 by adding a 1.0% aqueous solution of sodium hydroxide. Thereafter, the temperature is increased to 90° C. at a rate of 1° C./min while the pH is adjusted to 6.0 every 5° C., and the temperature is held at 90° C. When the shape and surface characteristics of the particles are observed using an optical microscope and a field-emission scanning electron microscope (FE-SEM), the coalescence of particles is observed at 10 hours; thus, the vessel is cooled to 30° C. with cooling water over 5 minutes.

The cooled slurry is passed through a nylon mesh with a mesh size of 15 μm so that coarse particles will be removed, and the slurry that has passed through the mesh is filtered under reduced pressure using an aspirator. The solids left on the filter paper are crushed manually into the smallest possible size, the resulting particles are put into deionized water (temperature, 30° C.), with its amount ten times greater than that of the solids, and the resulting mixture is stirred for 30 minutes. Subsequently, the mixture is filtered under reduced pressure using an aspirator, the solids left on the filter paper are crushed manually into the smallest possible size, the resulting particles are put into deionized water (temperature, 30° C.), with its amount ten times greater than that of the solids, and the resulting mixture is stirred for 30 minutes; thereafter, the mixture is filtered under reduced pressure using an aspirator again, and the electrical conductivity of the filtrate is measured. The solids are washed by repeating this operation until the electrical conductivity of the filtrate is reduced to 10 μS/cm or less.

The washed solids are finely crushed using a wet and dry granulator (COMIL), and the resulting particles are vacuum-dried for 36 hours in an oven at 25° C., giving base particles (1).

Base Particles (1) have a Volume-Average Particle Diameter of 8.0 μm.

One hundred parts of base particles (1) and 1.5 parts of hydrophobic silica (manufactured by Nippon Aerosil Co., Ltd.; RY50) are mixed together and blended for 30 minutes at a rotational frequency of 13000 rpm using a sample mill. The resulting mixture is sieved through a vibration sieve with a mesh size of 45 μm, yielding adhesive agent particles (1).

When thermal behavior in the range of temperatures from −150° C. to 100° C. is analyzed using a differential scanning calorimeter (manufactured by Shimadzu Corporation; DSC-60A) with adhesive agent particles (1) as the sample, two glass transition temperatures are observed. The two glass transition temperatures are −52° C. and 54° C.

When temperatures T1, T2, and T3 of adhesive agent particles (1) are determined by the measuring method described above, adhesive agent particles (1) satisfy formula 1, "10° C.≤T1−T2," temperature T3 is 75° C., and the temperature difference (T1−T3) is 15° C.

When a cross-section of adhesive agent particles (1) is observed using a scanning electron microscope (SEM), a sea-island structure is noticed. Adhesive agent particles (1) have a core portion in which the island phase is present and a shell layer from which the island phase is absent. The sea phase contains a styrene resin, whereas the island phase contains a (meth)acrylate resin.

Ten parts of adhesive agent particles (1) and 100 parts of the resin-coated carrier described below are put into a V-blender and stirred for 20 minutes, and, subsequently, the resulting mixture is sieved through a vibration sieve with a mesh size of 212 μm, yielding developer (1).

Mn—Mg—Sr ferrite particles (average particle diameter, 40 μm): 100 parts

Toluene: 14 parts

Polymethyl methacrylate: 2 parts

Carbon black (VXC72, manufactured by Cabot Corporation): 0.12 parts

The materials excluding the ferrite particles and glass beads (diameter, 1 mm; the same quantity as toluene) are mixed together, and the resulting mixture is stirred for 30 minutes at a rotational frequency of 1200 rpm using a sand mill manufactured by Kansai Paint Co., Ltd. to give a dispersion. This dispersion and the ferrite particles are put into a vacuum-degassing kneader, and the mixture is dried by reducing pressure with stirring to yield a resin-coated carrier. Examples 1 to 22 and Comparative Examples 1 and 2: Production of Perfect-Bound Booklets Developer (1), which contains adhesive agent particles (1), is placed into the developing unit of an electrophotographic image forming apparatus ("PC1120," manufactured by FUJIFILM Business Innovation Corp.).

For use as the sheets, A4-sized paper with a grammage presented in Table 1 is prepared.

With the image forming apparatus, a diagonal-stripe pattern of adhesive agent particles with a mass per area of 0.72 $g/m^2$ is formed in the region 3 mm from the edge at a shorter end (i.e., the region in which the adhesive layer is to be formed) of a sheet, and the adhesive agent particles are secured (i.e., the pattern is fixed) by passing the sheet through a belt-and-roller securing machine. The condition for securing the adhesive agent particles (i.e., the condition for fixing the pattern) is a heating temperature of 200° C. The line width of the diagonal-stripe pattern is changed to give multiple sheets with different amounts per unit area of the adhesive agent. The resulting sheets are cut into dimensions of 5 cm in height×9 cm in width with the adhesive layer positioned at the top, yielding sheets for a booklet. The region of the adhesive layer now measures 3 mm in height×9 cm in width.

Then the multiple sheets are collated by stacking them with the following parameters set as specified in Table 1 in such a manner that the adhesive layer is interposed between the sheets, creating a sheet set.

Amount per unit area ($m^2$) of the adhesive agent on the first surface side and the second surface side (expressed as "Amount of adhesive agent on the first and second surface sides" in Table 1)

Factor by which the amount of the adhesive agent in the adhesive layers interposed between sheets in the middle of the sheet set (i.e., the booklet) in the thickness direction, of the multiple adhesive layers interposed between the sheets, is greater than the amount of the adhesive agent in the adhesive layers interposed between sheets on the first surface side and the second surface side of the sheet set (i.e., the booklet) (expressed as "Factor by which the amount of adhesive agent increases from the first and second surface sides to the middle in the thickness direction" in Table 1)

Change in the amount of the adhesive agent between sets of five sheets by which the amount of the adhesive agent in the adhesive layers changes from each of the first surface side and the second surface side of the sheet set (i.e., the booklet) toward the middle of the sheet set (i.e., the booklet) in the thickness direction (expressed as "Differential amount of adhesive agent" in Table 1)

The number of sheets collated (expressed as "The number of sheets in the sheet set" in Table 1)

Subsequently, using "T130 Tabletop Impulse Sealer for Thick Gusset Pouch," manufactured by FUJIIMPULSE Co., Ltd., the sheet set (its adhesive layers) is subjected to pressure bonding for 2 seconds under the pressure and temperature conditions specified in Table 1 to produce a booklet.

It should be noted that in Example 22, a dot pattern of adhesive agent particles is formed instead of a diagonal-stripe pattern of adhesive agent particles, and the diameter of the dot pattern is changed to give multiple sheets with different amounts per unit area of the adhesive agent. Then the resulting multiple sheets are used to produce a booklet.

Evaluations

The booklet in each Example or Comparative Example is subjected to the following evaluations.

Strength of Bonding Between Sheets

Sheets are removed from the first surface of the booklet by peeling them away until a sheet located in the middle in the thickness direction comes to the surface. Subsequently, an end of the sheet located in the middle in the thickness direction (the end on the side without the adhesive layer) is lifted until the entire booklet is brought into the air, and the strength of bonding between sheets is evaluated according to the following criteria.

A: The sheet does not detach even after it is held for 5 seconds and then swung five times
B: Adhesion is maintained for 5 seconds
C: Adhesion is maintained for 2 seconds
D: The sheet detaches, and the booklet falls down, when the end of the sheet is lifted Peeling Defect in Sheets The first sheet is peeled away from the first surface of the booklet at a rate of 500 mm/min by holding an end of the sheet (the end on the side without the adhesive layer). The site of bonding after the peeling is examined, and whether the sheet is damaged or not is evaluated according to the following criteria.

A: In addition to the absence of tearing, no lint is observed on the peeled sheet
B: There is no tearing on the peeled sheet
C: A minor degree of tearing is observed on the surface of the peeled sheet
D: Tearing and damage are observed on the surface of the peeled sheet.

TABLE 1

| | Amount of adhesive agent on the first and second surface sides g/m2 | Factor by which the amount of adhesive agent increases from the first and second surface sides to the middle in the thickness direction times | Differential amount of adhesive agent g/m2 | Adhesive agent pattern — | The number of sheets in the sheet set sheets | Sheet grammage gsm | Pressure bonding conditions Pressure MPa | Pressure bonding conditions Temperature ° C. | Evaluations Bonding strength | Evaluations Peeling defect |
|---|---|---|---|---|---|---|---|---|---|---|
| Example 1 | 0.72 | 2 | 0.36 | Diagonal stripes | 25 | 70 | 0.2 | 200 | A | A |
| Example 2 | 0.72 | 1.1 | 0.07 | Diagonal stripes | 15 | 70 | 0.2 | 200 | C | A |
| Example 3 | 0.72 | 1.2 | 0.15 | Diagonal stripes | 15 | 70 | 0.2 | 200 | B | A |

TABLE 1-continued

| | Amount of adhesive agent on the first and second surface sides g/m2 | Factor by which the amount of adhesive agent increases from the first and second surface sides to the middle in the thickness direction times | Differential amount of adhesive agent g/m2 | Adhesive agent pattern — | The number of sheets in the sheet set sheets | Sheet grammage gsm | Pressure bonding conditions Pressure MPa | Temperature ° C. | Evaluations Bonding strength | Peeling defect |
|---|---|---|---|---|---|---|---|---|---|---|
| Example 4 | 0.72 | 4 | 0.48 | Diagonal stripes | 50 | 70 | 0.2 | 200 | A | B |
| Example 5 | 0.72 | 4.2 | 0.48 | Diagonal stripes | 50 | 70 | 0.2 | 200 | A | C |
| Example 6 | 0.9 | 1.3 | 0.15 | Diagonal stripes | 25 | 70 | 0.2 | 200 | B | C |
| Example 7 | 0.9 | 1.6 | 0.18 | Diagonal stripes | 25 | 70 | 0.2 | 200 | A | C |
| Example 8 | 0.54 | 3 | 0.54 | Diagonal stripes | 25 | 70 | 0.2 | 200 | C | A |
| Example 9 | 0.54 | 3.2 | 0.6 | Diagonal stripes | 25 | 70 | 0.2 | 200 | C | B |
| Example 10 | 0.72 | 1.3 | 0.18 | Diagonal stripes | 7 | 120 | 0.2 | 200 | A | C |
| Example 11 | 0.72 | 1.3 | 0.18 | Diagonal stripes | 10 | 120 | 0.2 | 200 | A | B |
| Example 12 | 0.72 | 2.5 | 0.18 | Diagonal stripes | 100 | 60 | 0.2 | 200 | B | A |
| Example 13 | 0.72 | 2.5 | 0.18 | Diagonal stripes | 110 | 60 | 0.2 | 200 | C | A |
| Example 14 | 0.72 | 2 | 0.36 | Diagonal stripes | 25 | 40 | 0.2 | 200 | A | B |
| Example 15 | 0.72 | 2 | 0.36 | Diagonal stripes | 25 | 50 | 0.2 | 200 | A | A |
| Example 16 | 0.72 | 2 | 0.36 | Diagonal stripes | 10 | 200 | 0.2 | 200 | B | A |
| Example 17 | 0.72 | 2 | 0.36 | Diagonal stripes | 10 | 210 | 0.2 | 200 | C | A |
| Example 18 | 0.72 | 2 | 0.36 | Diagonal stripes | 10 | 70 | 0.01 | 200 | B | A |
| Example 19 | 0.72 | 2 | 0.36 | Diagonal stripes | 50 | 70 | 1 | 200 | A | B |
| Example 20 | 0.72 | 2 | 0.36 | Diagonal stripes | 15 | 70 | 0.2 | 120 | C | A |
| Example 21 | 0.72 | 2 | 0.36 | Diagonal stripes | 25 | 70 | 0.2 | 250 | A | B |
| Example 22 | 0.72 | 2 | 0.36 | Dots | 25 | 70 | 0.2 | 200 | A | A |
| Comparative Example 1 | 1.8 | 1 | 0 | Diagonal stripes | 25 | 70 | 0.2 | 200 | A | D |
| Comparative Example 2 | 0.54 | 1 | 0 | Diagonal stripes | 25 | 70 | 0.2 | 200 | D | A |

From these results, it can be understood that the booklets in the Examples, compared with the booklets in the Comparative Examples, may exhibit strong adhesion between sheets and may be unlikely to experience a peeling defect (tearing or damage) when a sheet is peeled away.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A perfect-bound booklet including:

a sheet set that is a stack of multiple sheets; and multiple adhesive layers provided at an end of each sheet in the sheet set and interposed between the sheets and peelably bonding the sheets together, the multiple adhesive layers containing a thermoplastic adhesive agent, wherein:

an amount of the thermoplastic adhesive agent in the multiple adhesive layers changes from each of a first surface side and a second surface side of the booklet toward a middle of the booklet in a thickness direction.

(((2))) The perfect-bound booklet according to (((1))), wherein:

of the multiple adhesive layers interposed between the sheets, the adhesive layers interposed between the sheets in the middle of the booklet in the thickness direction contain the thermoplastic adhesive agent in an amount 1.2 times or more and 4.0 times or less greater than the amount of the thermoplastic adhesive agent in the adhesive layers interposed between the sheets on the first surface side and the second surface side of the booklet.

(((3))) The perfect-bound booklet according to (((1))) or (((2))), wherein:

a change in the amount of the adhesive agent per sheet between sets of five sheets by which the amount of the thermoplastic adhesive agent in the adhesive layers changes from each of the first surface side and the second surface side of the booklet toward the middle of the booklet in the thickness direction is 0.18 $g/m^2$ or more.

(((4))) The perfect-bound booklet according to any one of (((1))) to (((3))), wherein:

the adhesive layers are formed as a line pattern, a dot pattern, or a combination of the line pattern and the dot pattern of the thermoplastic adhesive agent.

(((5))) The perfect-bound booklet according to (((4))), wherein:

the amount of the thermoplastic adhesive agent in the multiple adhesive layers changes from each of the first surface side and the second surface side of the booklet toward the middle of the booklet in the thickness direction as a result of a change in at least one of a line width of the line pattern or a diameter of the dot pattern of the thermoplastic adhesive agent.

(((6))) The perfect-bound booklet according to any one of (((1))) to (((5))), wherein:

the thermoplastic adhesive agent is a pressure-induced phase transition adhesive agent containing at least two resins with different glass transition temperatures, with a difference between a lowest glass transition temperature and a highest glass transition temperature of the glass transition temperatures of the at least two resins being 30° C. or greater.

(((7))) The perfect-bound booklet according to any one of (((1))) to (((6))), wherein:

the sheet set is a sheet set that is a stack of 10 or more and 100 or fewer sheets as the multiple sheets.

(((8))) The perfect-bound booklet according to any one of (((1))) to (((7))), wherein:

a grammage of the sheets is 200 gsm or less.

(((9))) A method for manufacturing the perfect-bound booklet according to any one of (((1))) to (((8))), the method including:

attaching particles of the thermoplastic adhesive agent to an end of the multiple sheets;

securing the particles of the thermoplastic adhesive agent on the sheets; and stacking the multiple sheets having an adhesive layer containing the thermoplastic adhesive agent in such a manner that the adhesive layer is interposed between the sheets to give a sheet set and then pressure-bonding the sheets with the adhesive layer by applying pressure and heat to the adhesive layer.

(((10))) The method according to (((9))) for manufacturing a perfect-bound booklet, wherein:

in the attaching, the particles of the thermoplastic adhesive agent are attached to the end of the multiple sheets by electrophotography.

(((11))) The method according to (((9))) or (((10))) for manufacturing a perfect-bound booklet, wherein:

in the pressure-bonding, the sheets are pressure-bonded with the adhesive layer by applying a pressure of 0.01 MPa or more and 1 MPa or less and heat at 90° C. or above and 220° C. or below to the adhesive layer from a first surface side and a second surface side of the sheet set.

What is claimed is:

1. A perfect-bound booklet comprising:

a sheet set that is a stack of a plurality of sheets; and a plurality of adhesive layers, each adhesive layer of the plurality of adhesive layers is provided at an end of each sheet in the sheet set and is interposed between the sheets and peelably bonds the sheets together, the plurality of adhesive layers containing a thermoplastic adhesive agent, wherein:

an amount of the thermoplastic adhesive agent in the plurality of adhesive layers changes, in a thickness direction of the booklet, between a first surface side and a middle of the booklet and changes in the thickness direction between a second surface side of the booklet and the middle of the booklet, and the thermoplastic adhesive agent is a pressure-induced phase transition adhesive agent containing at least two resins with different glass transition temperatures, with a difference between a lowest glass transition temperature and a highest glass transition temperature of the glass transition temperatures of the at least two resins being 30° C. or greater.

2. The perfect-bound booklet according to claim 1, wherein:

of the plurality of adhesive layers interposed between the sheets, each adhesive layer of the plurality of the adhesive layers interposed between the sheets in the middle of the booklet in the thickness direction contain the thermoplastic adhesive agent in an amount 1.2 times or more and 4.0 times or less than the amount of the thermoplastic adhesive agent in each adhesive layer of the plurality of the adhesive layers interposed between the sheets on the first surface side and the second surface side of the booklet.

3. A method for manufacturing the perfect-bound booklet according to claim 2, the method comprising:

attaching particles of the thermoplastic adhesive agent to an end of each of the plurality of sheets;

securing the particles of the thermoplastic adhesive agent on each of the plurality of sheets; and stacking the plurality of sheets having an adhesive layer containing the thermoplastic adhesive agent in such a manner that the adhesive layer is interposed between two of the plurality of sheets to give a sheet set and then pressure-bonding the plurality of sheets comprising the adhesive layer by applying pressure and heat to the adhesive layer.

4. The method according to claim 3 for manufacturing a perfect-bound booklet, wherein:

in the attaching, the particles of the thermoplastic adhesive agent are attached to the end of each of the plurality of sheets by electrophotography.

5. The perfect-bound booklet according to claim 1, wherein:

a change in the amount of the adhesive agent per sheet between sets of five sheets by which the amount of the thermoplastic adhesive agent in each adhesive layer of the plurality of the adhesive layers changes from each of the first surface side and the second surface side of the booklet toward the middle of the booklet in the thickness direction is 0.18 $g/m^2$ or more.

6. A method for manufacturing the perfect-bound booklet according to claim 5, the method comprising:

attaching particles of the thermoplastic adhesive agent to an end of each of the plurality of sheets;

securing the particles of the thermoplastic adhesive agent on each of the plurality of sheets; and stacking the plurality of sheets having an adhesive layer containing the thermoplastic adhesive agent in such a manner that the adhesive layer is interposed between two of the plurality of sheets to give a sheet set and then pressure-bonding the plurality of sheets comprising the adhesive layer by applying pressure and heat to the adhesive layer.

7. The method according to claim 6 for manufacturing a perfect-bound booklet, wherein:

in the attaching, the particles of the thermoplastic adhesive agent are attached to the end of each of the plurality of sheets by electrophotography.

8. The perfect-bound booklet according to claim 1, wherein:

each adhesive layer of the plurality of the adhesive layers are formed as a line pattern, a dot pattern, or a combination of the line pattern and the dot pattern of the thermoplastic adhesive agent.

9. The perfect-bound booklet according to claim 8, wherein:

the amount of the thermoplastic adhesive agent in each adhesive layer of the plurality of adhesive layers changes from each of the first surface side and the second surface side of the booklet toward the middle of the booklet in the thickness direction as a result of a change in at least one of a line width of the line pattern or a diameter of the dot pattern of the thermoplastic adhesive agent.

10. A method for manufacturing the perfect-bound booklet according to claim 9, the method comprising:

attaching particles of the thermoplastic adhesive agent to an end of each of the plurality of sheets;

securing the particles of the thermoplastic adhesive agent on each of the plurality of sheets; and stacking the plurality of sheets having an adhesive layer containing the thermoplastic adhesive agent in such a manner that the adhesive layer is interposed between two of the plurality of sheets to give a sheet set and then pressure-bonding the plurality of sheets comprising the adhesive layer by applying pressure and heat to the adhesive layer.

11. A method for manufacturing the perfect-bound booklet according to claim 8, the method comprising:

attaching particles of the thermoplastic adhesive agent to an end of each of the plurality of sheets;

securing the particles of the thermoplastic adhesive agent on each of the plurality of sheets; and stacking the plurality of sheets having an adhesive layer containing the thermoplastic adhesive agent in such a manner that the adhesive layer is interposed between two of the plurality of sheets to give a sheet set and then pressure-bonding the plurality of sheets comprising the adhesive layer by applying pressure and heat to the adhesive layer.

12. The perfect-bound booklet according to claim 1, wherein:

the sheet set is a stack of 10 or more and 100 or fewer sheets.

13. A method for manufacturing the perfect-bound booklet according to claim 12, the method comprising:

attaching particles of the thermoplastic adhesive agent to an end of each of the plurality of sheets;

securing the particles of the thermoplastic adhesive agent on each of the plurality of sheets; and stacking the plurality of sheets having an adhesive layer containing the thermoplastic adhesive agent in such a manner that the adhesive layer is interposed between two of the plurality of sheets to give a sheet set and then pressure-bonding the plurality of sheets comprising the adhesive layer by applying pressure and heat to the adhesive layer.

14. The perfect-bound booklet according to claim 1, wherein:

a grammage of the sheets is 200 gsm or less.

15. A method for manufacturing the perfect-bound booklet according to claim 14, the method comprising:

attaching particles of the thermoplastic adhesive agent to an end of each of the plurality of sheets;

securing the particles of the thermoplastic adhesive agent on each of the plurality of sheets; and stacking the plurality of sheets having an adhesive layer containing the thermoplastic adhesive agent in such a manner that the adhesive layer is interposed between two of the plurality of sheets to give a sheet set and then pressure-bonding the plurality of sheets comprising the adhesive layer by applying pressure and heat to the adhesive layer.

16. A method for manufacturing the perfect-bound booklet according to claim 1, the method comprising:

attaching particles of the thermoplastic adhesive agent to an end of each of the plurality of sheets;

securing the particles of the thermoplastic adhesive agent on each of the plurality of sheets; and stacking the plurality of sheets having an adhesive layer containing the thermoplastic adhesive agent in such a manner that the adhesive layer is interposed between two of the plurality of sheets to give a sheet set and then pressure-bonding the plurality of sheets comprising the adhesive layer by applying pressure and heat to the adhesive layer.

17. The method according to claim 16 for manufacturing a perfect-bound booklet, wherein:

in the attaching, the particles of the thermoplastic adhesive agent are attached to the end of each of the plurality of sheets by electrophotography.

18. The method according to claim 16 for manufacturing a perfect-bound booklet, wherein:

in the pressure-bonding, the sheets are pressure-bonded with the adhesive layer by applying a pressure of 0.01 MPa or more and 1 MPa or less and heat at 90° C. or above and 220° C. or below to the adhesive layer from a first surface side and a second surface side of the sheet set.

19. The perfect-bound booklet according to claim 1, wherein the amount of thermoplastic adhesive agent is highest in the middle of the booklet.

20. The perfect-bound booklet comprising:

a sheet set that is a stack of a plurality of sheets; and a plurality of adhesive layers, each adhesive layer of the plurality of adhesive layers is provided at an end of each sheet in the sheet set and is interposed between the sheets and peelably bonds the sheets together, the plurality of adhesive layers containing a thermoplastic adhesive agent, wherein:

an amount of the thermoplastic adhesive agent in the plurality of adhesive layers changes, in a thickness direction of the booklet, between a first surface side and a middle of the booklet and changes in the thickness direction between a second surface side of the booklet and the middle of the booklet, each adhesive layer of the plurality of the adhesive layers are formed as a line pattern, a dot pattern, or a combination of the line pattern and the dot pattern of the thermoplastic adhesive agent, and the amount of the thermoplastic adhesive agent in each adhesive layer of the plurality of adhesive layers changes from each of the first surface side and the second surface side of the booklet toward the middle of the booklet in the thickness direction as a result of a change in at least one of a line width of the line pattern or a diameter of the dot pattern of the thermoplastic adhesive agent.

* * * * *